United States Patent
Sugita et al.

(10) Patent No.: US 7,903,310 B2
(45) Date of Patent: Mar. 8, 2011

(54) HOLOGRAM RECORDING/REPRODUCING APPARATUS, HOLOGRAM MULTIPLEX RECORDING METHOD, AND HOLOGRAM RECORDING MEDIUM UTILIZING REACTION RATE INFORMATION AND A RECORDING INTERVAL TIME BASED ON THE REACTION RATE INFORMATION

(75) Inventors: Tomoya Sugita, Nara (JP); Kenichi Kasazumi, Osaka (JP)

(73) Assignee: Panasonic Corporation, Osaka (JP)

( * ) Notice: Subject to any disclaimer, the term of this patent is extended or adjusted under 35 U.S.C. 154(b) by 829 days.

(21) Appl. No.: 11/889,298

(22) Filed: Aug. 10, 2007

(65) Prior Publication Data
US 2008/0037087 A1    Feb. 14, 2008

(51) Int. Cl.
*G03H 1/04*    (2006.01)
(52) U.S. Cl. .................. 359/35; 359/22; 359/32
(58) Field of Classification Search .......... None
See application file for complete search history.

(56) References Cited

U.S. PATENT DOCUMENTS 5,098,176 A * 3/1992 Wolf ............................. 359/11
5,543,251 A * 8/1996 Taylor ............................. 430/1

FOREIGN PATENT DOCUMENTS

| JP | 2005-189748 | 7/2005 |
| JP | 2005-327393 | 11/2005 |

* cited by examiner

*Primary Examiner* — Arnel C Lavarias
(74) *Attorney, Agent, or Firm* — Wenderoth, Lind & Ponack, L.L.P.

(57) ABSTRACT

An object is to prevent lowering of a dynamic range of a hologram recording medium without lowering an average data transfer rate, and to provide stabilized recording sensitivity. A scheduler determines a recording interval time from the point of time when light is irradiated to record a certain hologram of holograms to be multiplex-recorded to the point of time when light is irradiated to record a succeeding hologram in such a manner that at least parts of the holograms are recorded one over the other in a certain recording area. A recording interval time controller controls a light source to irradiate the light depending on the recording interval time determined by the scheduler.

27 Claims, 16 Drawing Sheets

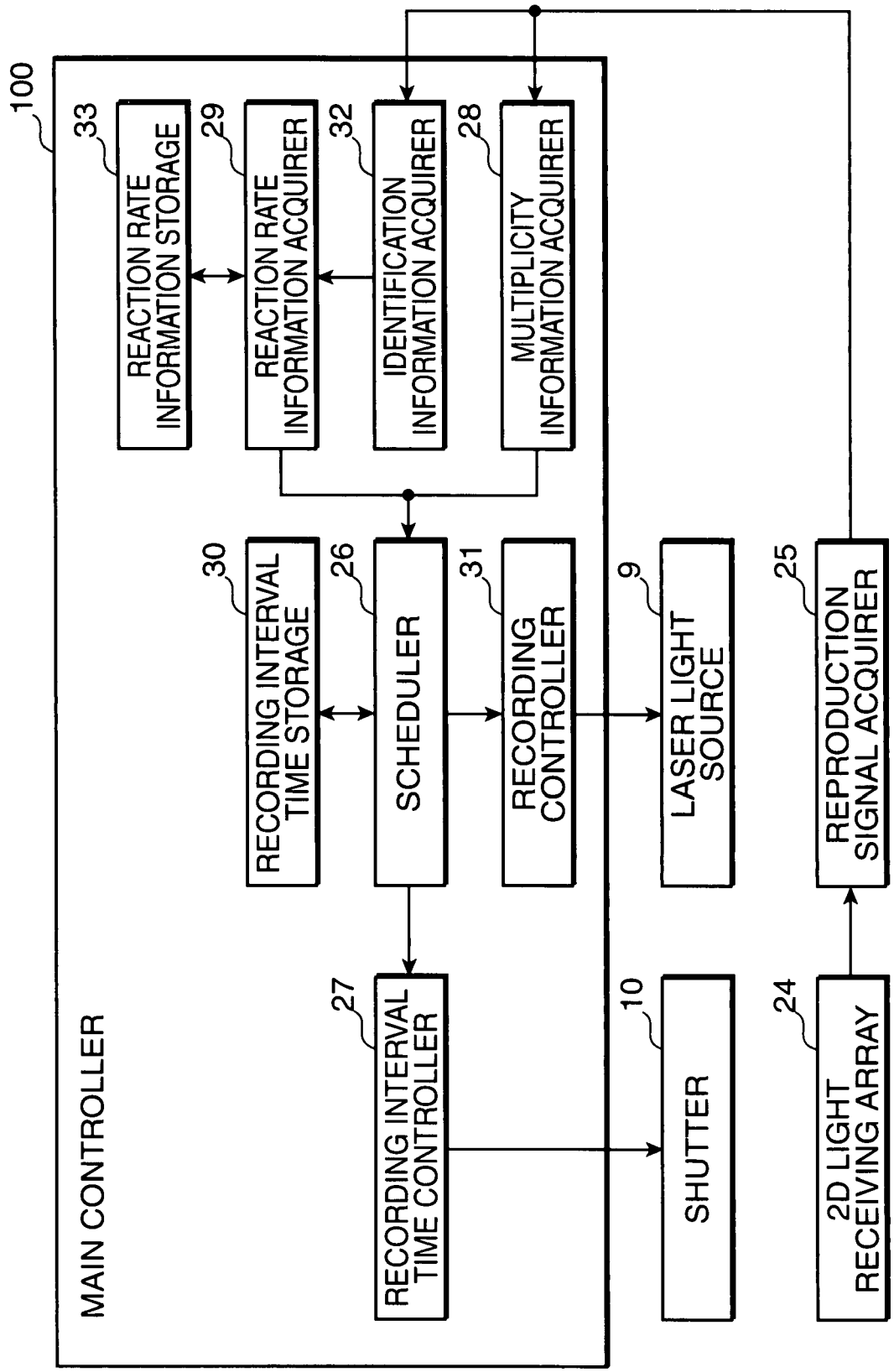

LIGHT IRRADIATION

POLYMERIZATION

DIFFUSION

HOLOGRAM RECORDING/REPRODUCING APPARATUS, HOLOGRAM MULTIPLEX RECORDING METHOD, AND HOLOGRAM RECORDING MEDIUM UTILIZING REACTION RATE INFORMATION AND A RECORDING INTERVAL TIME BASED ON THE REACTION RATE INFORMATION

BACKGROUND OF THE INVENTION

1. Field of the Invention

The present invention relates to a hologram recording/reproducing apparatus for multiplex recording holograms in a certain recording area of a hologram recording medium, as well as a hologram multiplex recording method, and a hologram recording medium.

2. Description of the Background Art

In recent years, as information technology such as information digitization has been rapidly developed, various contents information such as video or audio information are distributed to users at a high speed with high quality for users' utilization. As for the users' utilization, it is often the case that each user temporarily saves the distributed information in e.g. a hard disk, and then selects and/or edits the information which he or she wishes to store for a long term for storage into another recording medium. In view of this, there is a demand for establishing a system which enables to realize an ultra-high-speed recording/reproducing and an ultra-large-capacity storage in order to cope with an explosive increase in information amount concerning high-quality information and diversified demands in information utilization.

As one promising means for meeting the aforementioned demands, there has been proposed a hologram optical information recording/reproducing apparatus (also called as a hologram recording/reproducing apparatus, a hologram memory, or a holographic memory) which utilizes photon mode optical information recording. The hologram recording/reproducing system is a system configured in such a manner that a signal beam modulated depending on data to be recorded, and a reference beam are recorded in a hologram recording medium as an interference fringe, and the data recorded in the hologram recording medium is reproduced by causing a readout beam substantially equivalent to the reference beam to be incident onto the hologram recording medium recorded with the data. Hereinafter, the readout beam is also called as "reference beam for reproduction". Generally, a reference beam to be used in data recording is used as the reference beam for reproduction.

For instance, there is known a hologram memory optical system according to a shift multiplex recording system proposed by Psaltis et al., as an example of the hologram optical information recording system. In the system proposed by Psaltis et al., after the light emitted from a laser light source has its beam diameter expanded by a beam expander, the light beam is divided by a half mirror. After the beam division, one of the beams is transmitted through a spatial light modulator, condensed on a hologram recording medium by a Fourier transform lens, and turned into a signal beam. The other of the beams is turned into a reference beam for irradiating the same position on the hologram recording medium as the signal beam. The hologram recording medium is produced by e.g. sealably placing a hologram medium such as a photopolymer between e.g. two glass substrates to record an interference fringe by the signal beam and the reference beam.

The spatial light modulator is a two-dimensionally-arranged light switch array such as a liquid crystal panel or a DMD (digital micro mirror device), and is operated in such a manner that the light switches are independently turned on or off in response to an input signal to be recorded. For instance, if a spatial light modulator of 1,024×1,024 cells is used, one megabit information can be simultaneously displayed. When a signal beam is transmitted through the spatial light modulator, one megabit information to be displayed on the spatial light modulator is transformed into a two-dimensional light beam array, and recorded on a hologram recording medium as an interference fringe. In reproducing the recorded signal, merely the reference beam is irradiated onto the hologram recording medium, and a diffraction beam (also, called as "reproduction beam") from the hologram is received by a two-dimensional image acquirer such as a CMOS sensor or a CCD device.

The aforementioned hologram optical information recording system has the following features. Since the thickness of the hologram medium is as large as about 1 mm, data is recorded as a grating having a large interference fringe i.e. so-called Bragg grating, which allows for multiplex recording, and enables to realize a large-capacity optical recording system. The multiplex recording is one of the primary features of the hologram recording/reproducing. The multiplex recording/reproducing system has also been actively developed. For instance, in the aforementioned shift multiplex recording system, a spherical wave is used in hologram recording. With this arrangement, multiplex recording can be performed in such a manner that a certain area recorded with a hologram, and another area recorded with a succeeding hologram are partly lapped one over the other by shifting the two areas one from the other by a certain amount capable of selectively reproducing the two areas.

There are known, as other examples of the multiplex recording system, an angular multiplexing system, wherein multiplex recording/reproducing is performed with respect to a common area by changing an incident angle of one or both of a reference beam and a signal beam onto a hologram recording medium for each hologram recording; and a peristrophic multiplexing system, wherein multiplex recording is performed by rotating an incident direction of the reference beam or the signal beam onto a recording medium with respect to a normal of the recording medium.

In the angular multiplexing system, the incident angle is changed by mechanical means such as a galvanometric mirror, or electric means such as a deflector using an acoustic optical device or an electro-optic device. As a method for removing crosstalk between holograms to be formed by multiplex recording, there is proposed a polytopic multiplexing system, in which merely a reproduction beam is substantially extracted from a hologram by subjecting adjacent and multiplex-recorded holograms to be reproduced simultaneously to filtering by using an aperture or a like device. Also, there is proposed an approach of constituting a light flux deflector and a deflection controller of a wedge prism and a rotation manipulator for rotating the wedge prism, and performing an angular multiplexing recording and a peristrophic multiplexing recording in combination with each other. Further, there is proposed a system of performing an angular multiplexing recording with use of a spherical reference wave, while changing an incident angle of a reference beam.

The above arrangement utilizes that the incident angle of the reference beam to be received on individual parts of a disk-shaped hologram recording medium is slightly changed when the recording position is shifted by slightly rotating the recording medium. In the case where the thickness of the hologram medium is 1 mm, wavelength selectivity defined by a reproduction signal intensity is 0.014 degree in full width at half maximum. If holograms are multiplex-recorded at a pitch of about 20 µm, with use of 0.5 in numerical aperture (NA) of a reference beam, and 2 mmφ in hologram size, the recording density is 600 Gbit/inch². Thus, a hologram recording medium of 730 GB in terms of a 12 cm-disk capacity is provided.

Another multiplex recording system is proposed. For instance, with use of means for changing an incident angle or a phase distribution of a reference beam each time two-dimensional data is holographically recorded, it is possible to multiplex record holograms in one recording area of a hologram recording medium. By these multiplex recording systems, data can be recorded with extremely high density, which is advantageous in spectacularly increasing the recording capacity, as compared with a conventional optical disk such as a compact disk (CD) or a digital versatile disk (DVD).

With use of the aforementioned system, two-dimensional data displayed on the spatial light modulator can be concurrently recorded and reproduced. This enables to realize overwhelming high-speed data access, as compared with a CD or a DVD. The hologram recording/reproducing method including the multiplex recording system is primarily proposed to enhance the recording capacity by increasing the multiplicity, and an object thereof is to provide a multiplex recording principle/approach with respect to a hologram recording medium.

Generally, the hologram multiplex recording technique is directed to forming multiple holographic conditions in a common area of a hologram recording medium. Conventionally, the hologram multiplex recording technique has been realized by changing an angle, wavelength, phase code or a like parameter in recording or reproducing holograms. The common area is a volumetric area where at least parts of multiple holograms are lapped one over the other i.e. an area including an in-plane direction and a thickness direction of a recording medium. Many of the multiplexing recording method utilize light diffraction under Bragg conditions in order to separate the holograms one from the other for recording/reproducing.

For instance, in case of the angular multiplexing recording system, multiplex recording is performed by recording an interference fringe pattern to be formed by a signal beam carrying certain two-dimensional data, and a reference beam to be emitted from a light source for emitting the signal beam, as a refractive index distribution. The interference fringe pattern serves as a hologram. A diffraction beam corresponding to an intended hologram is obtained exclusively in a condition that the incident angle of a readout beam substantially coincides with the incident angle of the signal beam or the reference beam to be used in recording a hologram in the recording medium.

According to the multiplex recording system, independently readable holograms can be multiplex-recorded in a common volumetric area by changing the incident angle of at least one of the signal beam and the reference beam onto the recording medium. Now, let it be assumed that a change amount in incident angle capable of separating and reproducing a hologram in the common area is $\Delta\theta$, and the sum of the change amounts of the incident angles of the signal beam and the reference beam is $\theta$, then, $\theta/\Delta\theta$ holograms in number can be multiplexed.

In a hologram recording material such as a photopolymer, a performance index called M number (hereinafter, called as "M/#") is used. M/# represents an amount which is proportional to a square root of a diffraction efficiency and is proportional to a change in refractive index. The diffraction efficiency is a value in terms of a ratio of a diffraction beam to an incident beam, in place of percentage, and is a dimensionless number. As M/# is increased, the total diffraction efficiency is increased. A value obtained by dividing M/# with a square root of a minimal diffraction efficiency required in reproducing is the multiplicity number usable as a performance of the hologram recording material.

In the following, an idea on mechanical constraints or multiplicity limitation by a recording system in a hologram recording/reproducing apparatus is described. FIG. 15 is a schematic diagram for describing a general angular multiplexing recording system. FIG. 15 shows an arrangement relation between a cross section in thickness direction of a hologram recording medium, and a signal beam and a reference beam. In the example of FIG. 15, a signal beam 204 has a fixed incident angle with respect to a hologram recording medium 200, whereas a first reference beam 201, a second reference beam 202, and a third reference beam 203 are irradiated onto the hologram recording medium 200 with incident angles different from each other.

In the above arrangement, for instance, a hologram recorded by the signal beam 204 and the first reference beam 201 can be reproduced by causing a readout beam to be incident onto the hologram recording medium 200 with substantially the same angle arrangement as the first reference beam 201. The expression "substantially the same angle arrangement" includes a condition that the incident angle of the readout beam may not completely coincide with the incident angle of the first reference beam 201 to be used in recording due to shrinkage of the recording medium, thermal influence involved in recording/reproducing, or a like factor. Holograms are multiplex-recorded in a substantially common area of the hologram recording medium 200 by setting the incident angles of the first reference beam 201, the second reference beam 202, and the third reference beam 203 to such values capable of sufficiently separating the holograms to be reproduced by the corresponding readout beam one from the other, considering the above factors.

Hereinafter, the angle range capable of separating the holograms one from the other is called as "angle selectivity". If, for instance, the angle selectivity is 0.01°, and the angle range of a reference beam is maximally settable to 60° with respect to the normal of the recording medium, considering the mechanical constraints, the maximum multiplicity number is 3,000. The aforementioned description leads to a conclusion that a possible multiplicity number i.e. a recording capacity can be determined substantially by a multiplicity limit depending on the aforementioned recording material, which is determined by M/#; or a multiplicity limit depending on an angle resolution performance or a wavelength resolution performance depending on a multiplex recording system, or a phase code number, or a like parameter.

Various materials such as organic materials including a photopolymer, and inorganic materials called photo refractive crystals are proposed as the hologram recording medium. A variety of researches and developments have been made in various aspects including production method and production cost, based on basic properties of the materials such as recording sensitivity, recording capacity, and information retainability. The hologram recording/reproducing technique is generally directed to an information recording/reproducing system using a light behavior i.e. photon mode. In this context, the hologram recording medium is a photosensitive member in the aspect of recording system, and has a sensitivity to light of a wavelength equal to smaller than a wavelength in a visible light wavelength band.

Hologram recording using a general holographic material e.g. a photopolymer material, is performed, by utilizing a difference in refractive index between a polymer obtained by polymerizing monomers by light irradiation, and a matrix material or a binder. In using these materials as the recording material, a reaction suppressant for inhibiting photopolymerization from initiating by a meager amount of unwanted light e.g. stray light, or a pigment for increasing the sensitivity to light of a wavelength for recording may be added.

In practice, for instance, in the case where a radically polymerizable photopolymer is used, after a light energy carrying interference pattern information is irradiated onto a recording medium, a series of processes comprising light absorption by the pigment, radical generation, polymerization, and diffusion/fixation are carried out. It is known that a certain time is required for completing an interference pattern formation (hereinafter, also called as "hologram formation") by the series of chemical/structural changes.

In the following, a process of hologram formation is described. FIGS. 16A through 16C are conceptual diagrams for describing the hologram formation process. FIG. 16A is a diagram showing a step of irradiating light onto a hologram recording medium. FIG. 16B is a diagram showing a step of polymerizing monomers by light irradiation. FIG. 16C is a diagram showing a step of diffusively migrating monomers and a binder, which conceivably corresponds to a phenomenon of alleviating a relative monomer concentration distribution expressed in the recording medium in FIG. 16B.

For instance, as shown in FIG. 16A, light 105 is irradiated onto a hologram recording medium 101 containing monomers 102 and a binder 103 in a mixed state. The refractive index "n" of the monomers 102 is 1.45, and the refractive index "n" of the binder 103 is 1.58. In using the photopolymerizable hologram recording medium 101, the polymer 104 polymerized by the light irradiation in FIG. 16B has a relatively large refractive index "n" to the other part of the recording medium 101 i.e. the area where the binder 103 and the monomers 102 are co-existent. The refractive index "n" of the polymer 104 is 1.48.

A concentration distribution concerning the monomers 102 and the binder 103 is generated resulting from the polymer 104 formed by the polymerization. As a result, referring to FIG. 16C, the monomers 102 and the binder 103 diffusively migrate in such a manner as to alleviate the concentration distribution. Finally, a refractive index distribution shows such a characteristic that the refractive index "n" of the polymerized part formed by light irradiation is smaller than that of the peripheral part which has not undergone the light irradiation. In use of the conventional hologram recording material, a time required for interference pattern formation cannot be desirably reduced, and a long time is required to form an interference pattern, as compared with an irradiation time of a reference beam for recording, and a signal beam.

Another hologram recording material such as an organic photorefractive material or a ferroelectric liquid crystal material has also been researched and developed. Even with use of these materials, in most of the cases, an interference pattern formation time is long, as compared with a light irradiation time, because an interference pattern is formed, in other words, hologram recording is performed by utilizing a chemical and/or structural change resulting from irradiation of a reference beam and a signal beam. Also, the aforementioned interference pattern formation may progress after the irradiation of the signal beam and the reference beam for hologram recording is terminated, depending on the components constituting the recording material to be used. This is generally called a dark response.

The interference pattern formation time, irrespective of whether a dark response is included or not, or irrespective of whether the response is large or small, is determined based on a composition ratio of the ingredients constituting the recording material or a like factor, considering the basic performance of a targeted recording medium to be produced. In view of this, although it is possible to shorten the interference pattern formation time by a material design process of increasing the material sensitivity or the diffusion rate, or a like measure, it is necessary to consider other features of multiplex-recordable recording medium available as a large-capacity storage e.g. suppressing occurrence of shrinkage, or securing controllability in diffraction efficiency of each hologram.

As a general finding, there is known a performance index called recording sensitivity. The recording sensitivity is expressed by a value of a square root of a diffraction efficiency with respect to an energy amount (unit: $mJ/cm^2$, for instance) required for recording a hologram to be irradiated per unit area. The energy amount is hereinafter called as "recording energy amount". The diffraction efficiency is a value in terms of a ratio of a diffraction beam to an incident beam, in place of percentage, and is a dimensionless number. The recording sensitivity is assumed to have a relevancy to the amount of residual monomers, i.e. monomers which are not polymerized, in use of e.g. a photopolymerizable photopolymer. In other words, since a recording medium in an unrecorded condition has a high recording sensitivity due to the abundant existence of residual monomers, an intended diffraction efficiency can be obtained with a small irradiation energy amount.

However, as the multiplex recording progresses, the residual monomer amount is decreased, and accordingly, the recording sensitivity is degraded. To compensate for the drawback, there is proposed a method for securing a diffraction efficiency substantially equivalent to a condition before the multiplex recording progresses by increasing the irradiation energy amount. The method is e.g. disclosed in Japanese Unexamined Patent Publication No. 2005-327393 (D1) and Japanese Unexamined Patent Publication No. 2005-189748 (D2).

The above discussion also leads to an idea that the recording sensitivity is determined by integration of a given irradiation energy amount, because the recording sensitivity is affected by a monomer consumption rate. In view of this, it is possible to calculate a current recording sensitivity in a targeted area of a hologram recording medium by grasping the irradiation energy amount applied to the targeted area.

Concerning a hologram recording technique, particularly, a hologram recording technique based on multiplex recording, there is known an approach of performing scheduling concerning a recording operation (hereinafter, called as "scheduling recording"). This is an approach of setting individual diffraction efficiencies of multiplex-recorded holograms to a fixed value by controlling the recording energy amount depending on the number of times of multiplex recording, in the case where the recording sensitivity is changed with respect to a hologram recording medium.

For instance, D1 proposes, in a shift multiplexing recording system, a method for irradiating recording beam, which is the sum of a signal beam and a reference beam, by performing a multiplicity specifying step of specifying the multiplicity number of holograms recorded in a recording layer, and an irradiation condition determining step of determining an irradiation energy amount of a recording beam. Specifically, D1 discloses a method for controlling the irradiation energy amount by changing a recording irradiation time or a recording optical power.

D2 proposes a method for increasing a recording optical power depending on lowering of a recording sensitivity of a hologram recording medium by setting a recording time per data page in a multiplex recording step i.e. a light irradiation time onto the hologram recording medium to a fixed value. D2 also proposes a method for decreasing the information amount per data page depending on lowering of the recording sensitivity of the hologram recording medium by setting the recording time and the recording optical power to a fixed value. Both of D1 and D2 have an object to suppress or prevent increase of a recording time resulting from lowering of recording sensitivity of the hologram recording medium, in other words, lowering or fluctuation of data transfer rate.

A research has been made concerning hologram multiplex recording/reproducing with respect to a photopolymer, which is a material constituting a general hologram recording medium, with use of the conventional multiplex recording system including the above proposed methods. As a result of the research, there is found a phenomenon that the dynamic range is lowered i.e. recording is disabled before a current recording capacity reaches a potential recording capacity estimated to be inherently provided in the hologram recording medium, or presented by the manufacturer of the recording medium. In view of this, it is necessary to prevent lowering of the dynamic range in order to realize a high-density and large-capacity recording, which is a primary feature of the hologram recording/reproducing.

SUMMARY OF THE INVENTION

In view of the above problems residing in the prior art, it is an object of the invention to provide a multiplex recording method that enables to prevent lowering of a dynamic range of a hologram recording medium, without lowering an average data transfer rate, and to provide stabilized recording sensitivity, as well as a hologram recording medium, and a hologram recording/reproducing apparatus.

A hologram recording/reproducing apparatus according to an aspect of the invention is a hologram recording/reproducing apparatus for recording holograms to be formed by a signal beam carrying certain two-dimensional data, and a reference beam to be emitted from a light source for emitting the signal beam in a certain recording area of a hologram recording medium multiple times, and for reproducing the recorded holograms by irradiating the reference beam. The apparatus includes: a recording interval time determining section for determining a recording interval time from the point of time when light is irradiated to record a certain hologram of the holograms to be multiplex-recorded to the point of time when light is irradiated to record a succeeding hologram in such a manner that at least parts of the holograms are recorded one over the other in the certain recording area; and a controlling section for controlling the light to be irradiated from the light source depending on the recording interval time determined by the recording interval time determining section.

A hologram multiplex recording method according to another aspect of the invention is a hologram multiplex recording method for recording holograms to be formed by a signal beam carrying certain two-dimensional data, and a reference beam to be emitted from a light source for emitting the signal beam in a certain recording area of a hologram recording medium multiple times. The method includes: a recording interval time determining step of determining a recording interval time from the point of time when light is irradiated to record a certain hologram of the holograms to be multiplex-recorded to the point of time when light is irradiated to record a succeeding hologram in such a manner that at least parts of the holograms are recorded one over the other in the certain recording area; and a controlling step of controlling the light to be irradiated from the light source depending on the recording interval time determined in the recording interval time determining step.

A hologram recording medium according to yet another aspect of the invention is a hologram recording medium provided with a recording layer and adapted for use in recording information by forming holograms by irradiation of a reference beam and a signal beam onto the recording layer, wherein the hologram recording medium is pre-recorded with reaction rate information relating to a reaction rate of a material composing the recording layer, at which the hologram having an intended diffraction efficiency is to be formed on the recording layer by light irradiation, or recording interval time information relating to a recording interval time from the point of time when light is irradiated to record a certain hologram of the holograms to be multiplex-recorded to the point of time when light is irradiated to record a succeeding hologram in such a manner that at least parts of the holograms are recorded one over the other in the certain recording area.

These and other objects, features and advantages of the present invention will become more apparent upon reading the following detailed description along with the accompanying drawing.

BRIEF DESCRIPTION OF THE DRAWINGS

FIG. 10 is a block diagram showing a schematic arrangement of a hologram recording/reproducing apparatus as a modification in the second embodiment of the invention.

DETAILED DESCRIPTION OF THE PREFERRED EMBODIMENTS

Figure 1A:
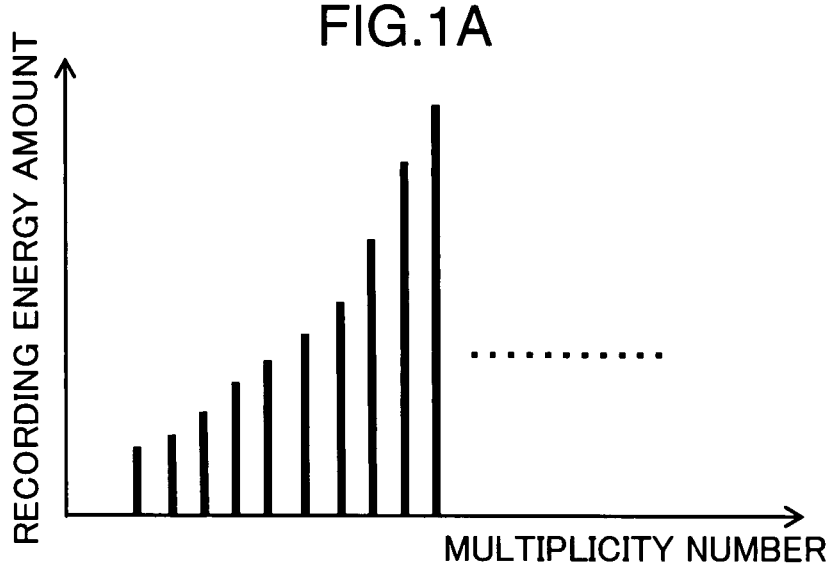
FIG. 1A is a diagram schematically showing a relation between the multiplicity number of holograms, and a recording energy amount.

In the following, embodiments of the invention are described referring to the drawings. The following embodiments are merely examples embodying the invention, and do not limit the technical scope of the invention.

First Embodiment

First, an advantage of a hologram multiplex recording method of a first embodiment of the invention is described as to how lowering of a dynamic range of a hologram recording medium is prevented.

Figure 1B:
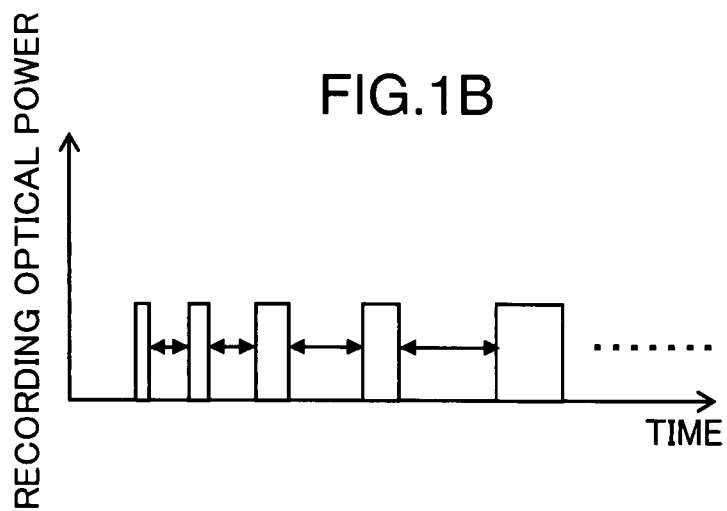
FIG. 1B is a diagram schematically showing an example of an idea of scheduling hologram multiplex recording in a first embodiment of the invention.
Figure 1C:
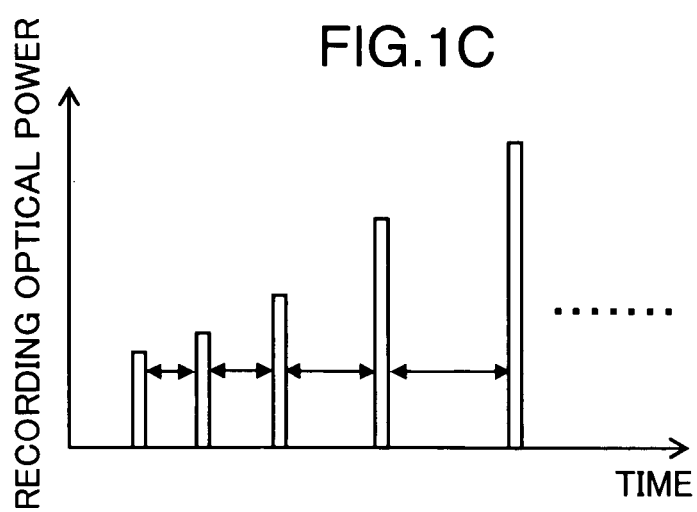
FIG. 1C is a diagram schematically showing another example of the idea of scheduling hologram multiplex recording in the first embodiment.

FIGS. 1A through 1C are diagrams schematically showing the hologram multiplex recording method of the first embodiment. FIG. 1A is a diagram schematically showing a relation between the multiplicity number of holograms, and a recording energy amount. FIG. 1B is a diagram schematically showing an example of an idea of scheduling hologram multiplex recording in the first embodiment. FIG. 1C is a diagram schematically showing another example of the idea of scheduling hologram multiplex recording in the first embodiment.

Figure 2A:
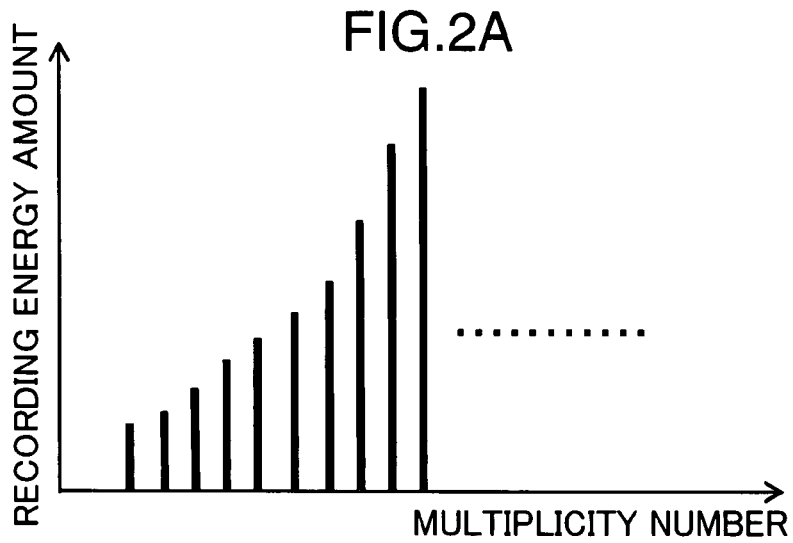
FIG. 2A is a diagram schematically showing a relation between the multiplicity number of holograms, and a recording energy amount.
Figure 2B:
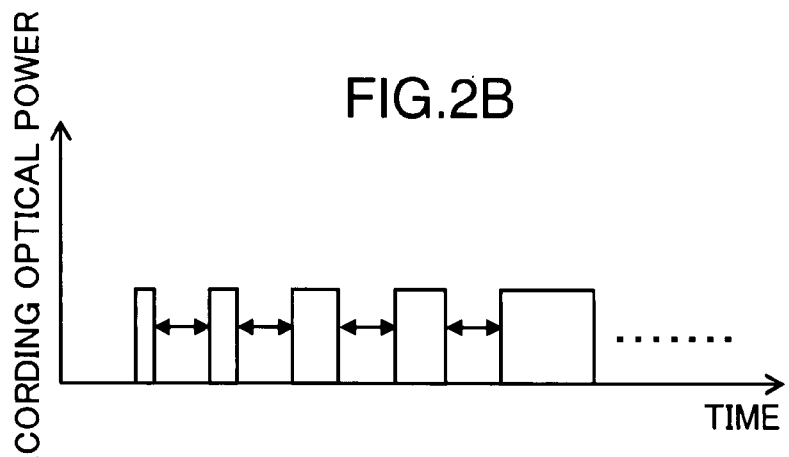
FIG. 2B is a diagram schematically showing an example of an idea of scheduling hologram multiplex recording in the conventional art.
Figure 2C:
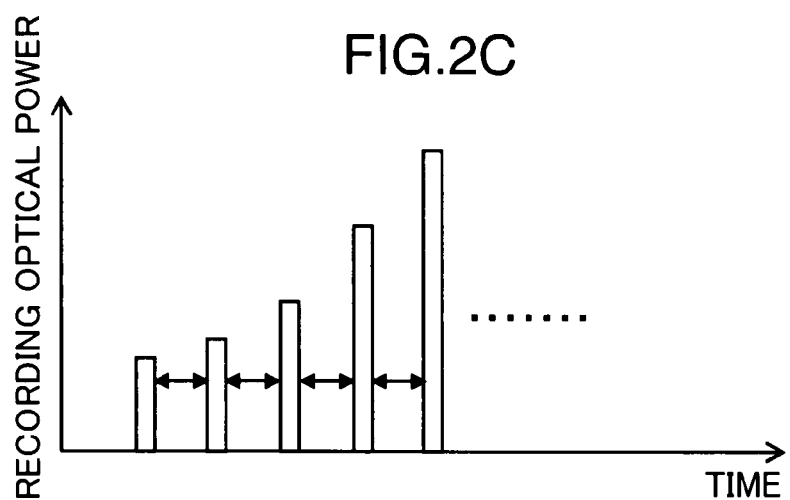
FIG. 2C is a diagram schematically showing another example of the idea of scheduling hologram multiplex recording in the conventional art.

FIGS. 2A through 2C are diagrams schematically showing a hologram multiplex recording system proposed in the Description of the Background Art, as an example of a general multiplex recording system. FIG. 2A is a diagram schematically showing a relation between the multiplicity number of holograms, and a recording energy amount. FIG. 2B is a diagram schematically showing an example of an idea of scheduling hologram multiplex recording in the conventional art. FIG. 2C is a diagram schematically showing another example of the idea of scheduling hologram multiplex recording in the conventional art.

Referring to FIGS. 1A and 2A, each axis of abscissas represents the multiplicity number of holograms, and each axis of ordinate represents a recording energy amount to be irradiated (=irradiation light intensity×time). In FIGS. 1B, 1C, 2B, and 2C, each axis of abscissas represents a time, and each axis of ordinate represents a recording optical power, which is the sum of optical powers of a signal beam and a reference beam required in recording.

As a technique of scheduling recording in the conventional hologram multiplex recording method, there is proposed changing the recording energy amount depending on the multiplicity number of holograms to be recorded, as shown in FIGS. 1A and 2A. In this technique, the light energy to be irradiated onto a hologram recording medium is controlled by a recording optical power, which is the sum of a reference beam intensity and a signal beam intensity, or an irradiation time. In the above arrangement, as shown in FIGS. 2B and 2C, it is a common practice to set a duration (hereinafter, called as "recording interval time") from the point of time when light irradiation necessary for recording a certain hologram is terminated to the point of time when light irradiation is started to record a succeeding hologram in at least a part of the area where the preceding hologram has been recorded, to a fixed value.

As shown in FIGS. 1B and 1C, a gist of the embodiment of the invention is to positively change the recording interval time depending on a reaction rate of a hologram medium, which corresponds to a time required for a hologram having an intended diffraction efficiency to be formed for recording by light irradiation, in addition to changing the recording energy amount required for recording individual holograms in multiplex recording. More specifically, a gist of the embodiment is to increase the recording interval time, as the multiplicity is increased, in other words, as the multiplex recording proceeds from an initial stage toward a late stage.

Figure 3:
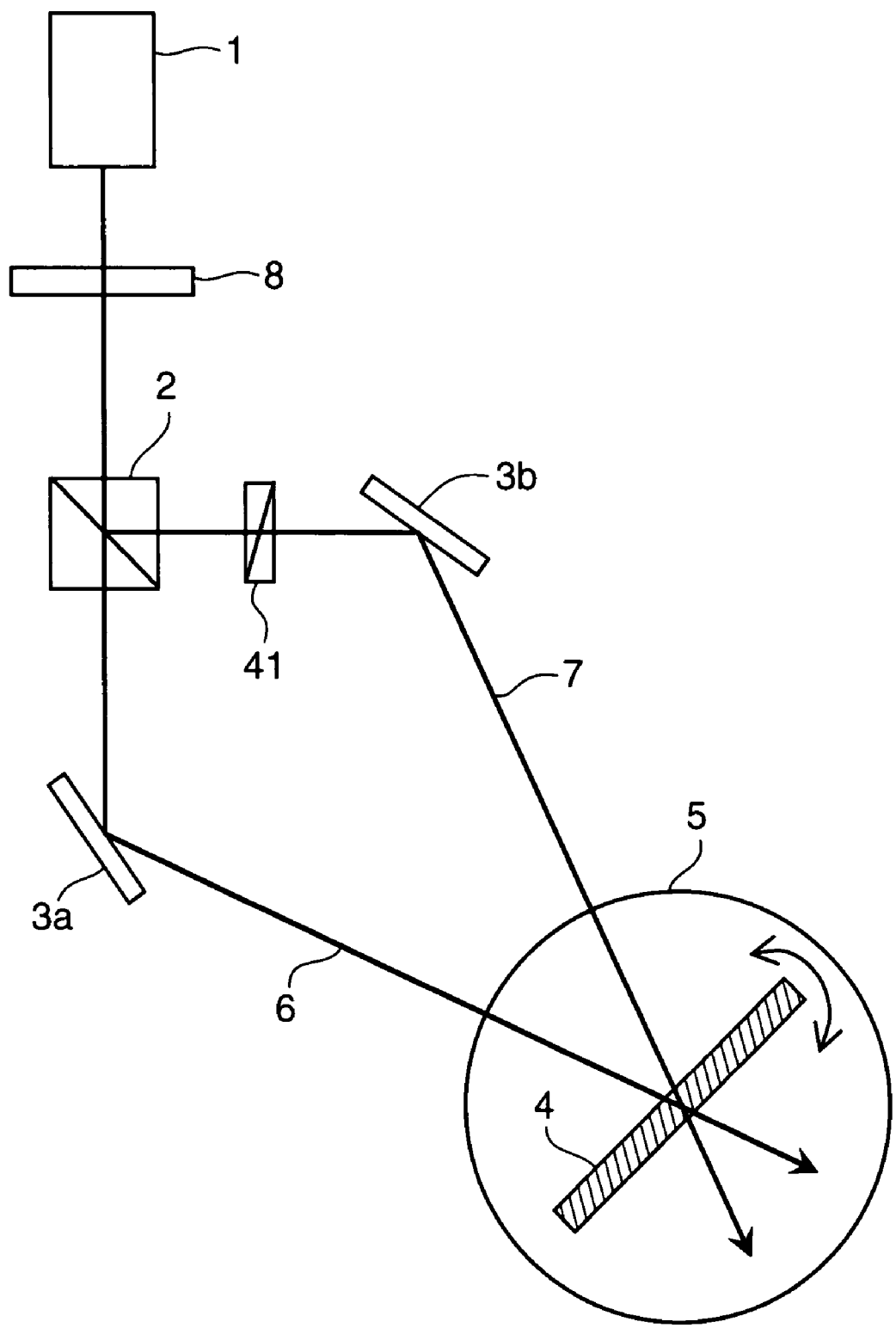
FIG. 3 is a diagram schematically showing an arrangement of an optical system of a hologram recording apparatus used in an experiment.

The inventors have conducted an experiment on hologram multiplex recording by a simple grating system, using two light flux interference, to measure M/#, which is a material performance of a hologram recording medium. As an experimental system parameter, a hologram recording medium i.e. Aprilis HMC-050-G-12-D-400 (thickness: 400 μm) was used, and multiplex recording was performed with an optical arrangement shown in FIG. 3. FIG. 3 is a diagram schematically showing the arrangement of an optical system in a hologram recording apparatus used in the experiment. Referring to FIG. 3, the hologram recording apparatus includes a laser light source 1, a polarizing beam splitter (hereinafter, called as "PBS") 2 for splitting laser light from the laser light source 1 into two beams, mirrors 3a, 3b, a rotating stage 5 for rotating a hologram recording medium 4, and a shutter 8. The arrangement uses a two light flux interference system excluding modulated signal data. For sake of easy explanation, light reflected on the mirror 3a serves as a signal beam 6, and light reflected on the mirror 3b serves as a reference beam 7.

In the above arrangement, laser light emitted from the laser light source 1 is collimated into parallel light with a diameter of 5 mm by an expanding optical system, a spatial filter, and a collimator lens, all of which are not shown. Thereafter, the parallel light is split into two parallel beams by the PBS 2 i.e. the signal beam 6 and the reference beam 7. Since the beams are split by polarization of the PBS 2, the polarizing directions of the beams after the beam splitting are orthogonal to each other. In view of this, a half-wavelength plate 41 is provided at an appropriate position on an optical path of the reference beam 7 to coincide the polarizing directions of the two beams with each other.

The signal beam 6 is reflected on the mirror 3a, and the reference beam 7 is reflected on the mirror 3b to allow the reflected beams to be irradiated onto a common area of the hologram recording medium 4. At the irradiation, an interference fringe spatially formed by the signal beam 6 and the reference beam 7 is recorded in the irradiation area of the hologram recording medium 4 as a hologram. The recording energy amount required for recording the hologram is controlled by an opening time of the shutter 8 and an emission power of the laser light source 1. Also, the angle defined by the signal beam 6 and the reference beam 7 is set to a fixed value, and an angular multiplexing recording can be realized by rotating the hologram recording medium 4 by the rotating stage 5.

The opening time and the opening timing of the shutter 8, and the rotation angle and the rotation timing of the rotating stage 5 are controlled by a computer (not shown). In the experimental examination, M/# was compared by using a recording energy amount which is changeable depending on a recording light intensity and a recording time, as a parameter. An angular multiplexing recording was performed by setting the recording interval time to a fixed value e.g. 5 seconds, rotating the rotating stage 5 i.e. the hologram recording medium 4 by two degrees at each rotation, and multiplex recording holograms by the multiplicity of 31, i.e. thirty-one times.

Figure 4:
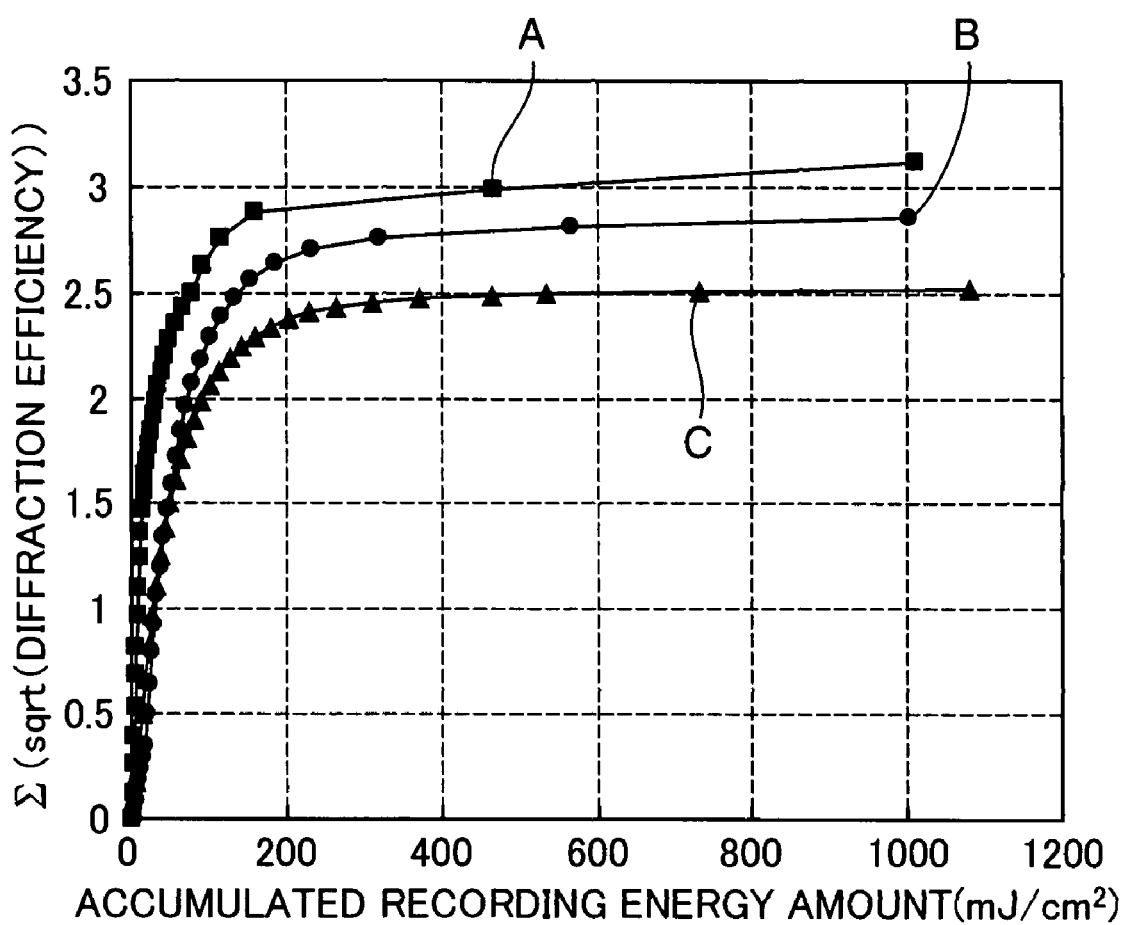
FIG. 4 is a graph showing an experiment result on multiplex recording in the case where a recording energy amount required for hologram recording is changed.

FIG. 4 is a graph showing an experiment result on the multiplex recording in the case where the recording energy amount was changed. Referring to FIG. 4, the axis of abscissas represents an accumulated recording energy amount, and the axis of ordinate represents a value obtained by integrating square roots of individual diffraction efficiencies of the multiplex-recorded holograms. The respective saturation (peak) points on the axis of ordinate represent M/#. The conditions "A", "B", and "C" in FIG. 4 indicate results obtained by performing multiplex recording, wherein the respective recording energy amounts are changed by changing the recording light intensity and the irradiation time in such a manner that the recording energy amount for recording a hologram satisfies a requirement: the recording energy amount under the condition "A"<the recording energy amount under the condition "B"<the recording energy amount under the condition "C", with respect to different areas of a hologram recording medium.

More specifically, the irradiation time was scheduled by setting the optical power density of an irradiation beam to be used in recording to a fixed value of about 23 mW/cm$^2$, and setting the recording energy amount ratio in the conditions "A", "B", and "C" to 1:2:4, in other words, the hologram intensity ratio or the diffraction efficiency ratio in the conditions "A", "B", and "C" to 1:4:16. Also, an examination was made in this condition by using the recording energy amount corresponding to the diffraction efficiency of a hologram in the condition "A" of 0.01, as a reference. It should be noted that the recording energy amount at the thirty-first recording is deviated from the above requirement on the irradiation time, i.e. the requirement that the recording energy amount ratio in the conditions "A", "B", and "C" should be 1:2:4 to make the recording energy amounts accumulated until thirty-one holograms are recorded substantially coincident with each other in the conditions "A", B", and "C".

An observation on the graph shown in FIG. 4 provided the inventors with a finding that a smaller recording energy amount per hologram i.e. a smaller diffraction efficiency per hologram enables to increase M/#. In the course of a further examination while focusing on the above finding, the inventors came up with an idea that a reaction rate of a hologram recording medium (i.e. a speed required in the multiplex recording from the point of time when a hologram is started to be recorded by light irradiation to the point of time when the diffraction efficiency of the hologram attains an intended value) may change, as the multiplex recording progresses, besides a change in recording sensitivity, which has been conventionally known. In other words, the inventors came up with a hypothesis that a hologram formation rate i.e. a reaction rate in hologram recording may be associated with a recording energy amount to be irradiated and/or recording interval time.

Thus, the inventors examined dependency of M/# on recording interval time in the multiplex recording to empirically verify the hypothesis. The inventors performed an angular multiplexing recording with respect to thirty-one holograms, with use of a fixed recording energy amount. More specifically, exposure energies depending on the multiplicity number were calculated, based on a recording sensitivity characteristic of the hologram recording medium, and recording energy amounts were controlled by irradiation times, with use of a fixed recording power density of about 23 mW/cm$^2$. The recording characteristics at recording interval times of 1 second, 2 seconds, 5 seconds, and 10 seconds were compared, by using the recording interval times as a parameter.

Figure 5:
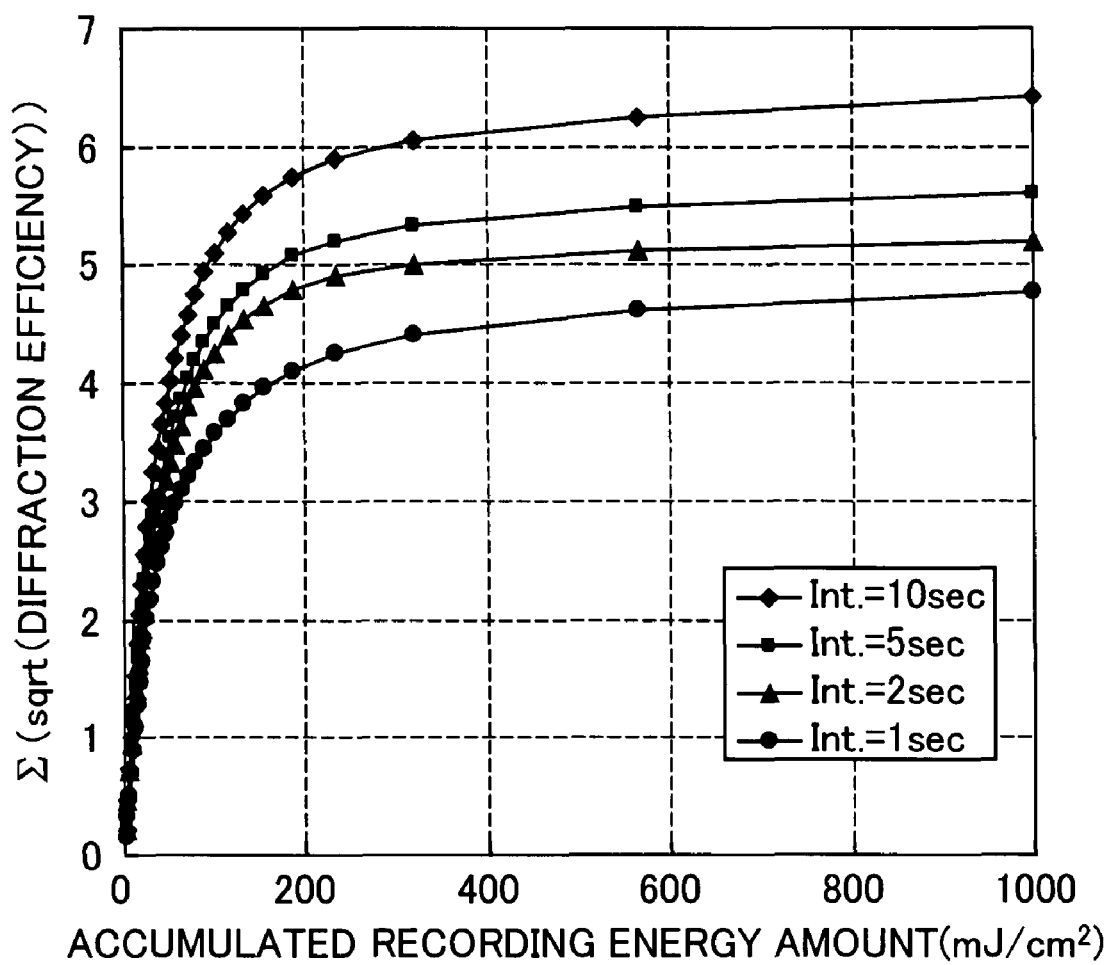
FIG. 5 is a graph showing an experiment result on multiplex recording in the case where a recording interval time is changed.

FIG. 5 is a graph showing an experiment result on multiplex recording in the case where the recording interval time is changed. Referring to FIG. 5, the axis of abscissas represents an accumulated recording energy amount in multiplex recording thirty-one holograms, and the axis of ordinate represents the sum of square roots of individual diffraction efficiencies of the multiplex-recorded holograms. The respective saturation (peak) points on the axis of ordinate represent M/#.

As is obvious from the graph shown in FIG. 5, it is recognized that as the recording interval time is increased, M/# is increased. This shows that an interference pattern formation progresses, in other words, a dark response greatly affects after irradiation of the signal beam and the reference beam for hologram recording is terminated. It is conceived that a magnitude of the dark response, and a time required until the dark response is over i.e. a reaction time or a reaction rate depend on the residual monomer amount and the amount of an initiating reagent i.e. radicals to be excited, in other words, the accumulated recording energy amount.

Figure 16A:
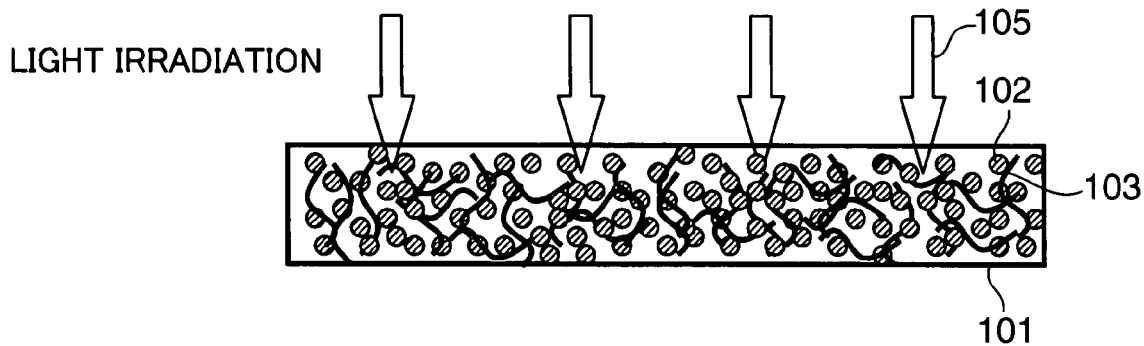
FIG. 16A is a diagram showing a step of irradiating light onto a hologram recording medium.
Figure 16B:
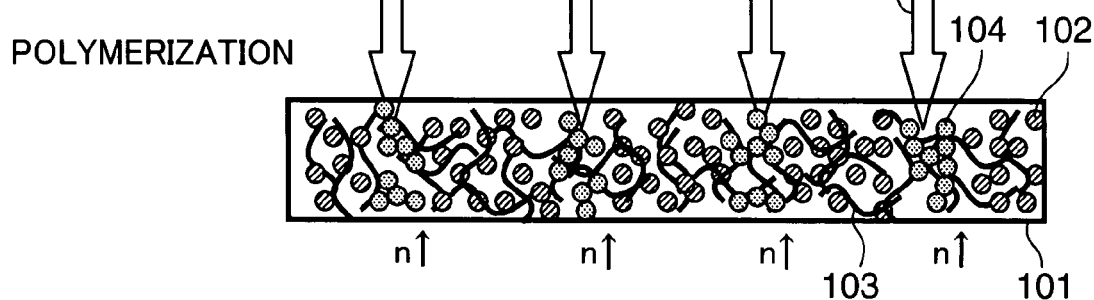
FIG. 16B is a diagram showing a step of polymerizing monomers by light irradiation.
Figure 16C:
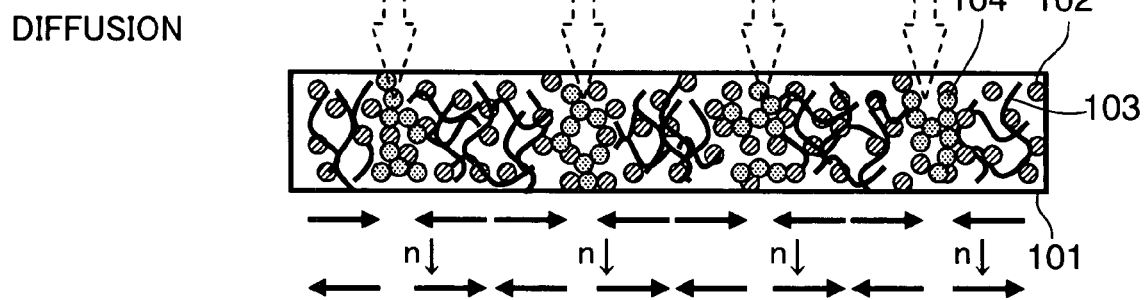
FIG. 16C is a diagram showing a step of diffusively migrating monomers and a binder, which conceivably corresponds to a phenomenon of alleviating a relative monomer concentration distribution expressed in the recording medium shown in FIG. 16B.

In other words, in an initial stage of multiplex recording, polymerizable or diffusively migratable monomers abundantly exist in the course of a reaction process as shown in FIGS. 16A through 16C. Also, unpolymerized monomers have a low viscosity, and accordingly easily migrate in the recording medium. Accordingly, in the initial stage of multiplex recording, the rate of forming a refractive index distribution including the dark response i.e. the reaction rate is fast, and the reaction time is short. On the other hand, as the multiplicity of multiplex recording is increased, the monomer amount and the monomer density are decreased. As a result, polymerization reaction by proximity of monomers is less likely to progress.

Further, since polymerized molecules obtained by the polymerization reaction are fixed in the recording medium, apparent viscosity is increased. As a result, the diffusion/migration rate of monomers required for forming the refractive index distribution is substantially decreased. Consequently, in the late stage of multiplex recording, the reaction rate is decreased, and the reaction time is increased. Thus, the graphical expression in FIG. 5 provides the following reading. In the initial stage of multiplex recording with a less accumulated recording energy amount, e.g. in an area in FIG. 5 where the accumulated recording energy amount is equal to or smaller than 50 mJ/cm$^2$, there is no or less difference in gradient of the graph among the samples with the recording interval times of 1 second, 2 seconds, 5 seconds, and 10 seconds, and the difference in diffraction efficiency of holograms to be recorded after the multiplex recording has entered an intermediate stage and thereafter determines the quality of the recording characteristic i.e. a magnitude of M/#.

In the following, relations among the recording interval time, M/#, and the recording sensitivity are described further in detail. For instance, if light is irradiated to record a certain hologram A, and light is irradiated to record another hologram B during progress of a dark response, monomers in the course of forming an interference fringe pattern of the hologram A are trapped by newly excited radicals, thereby obstructing the monomers from contributing to formation of the interference fringe pattern of the hologram A. In view of the above, it is necessary to apply a sufficiently large recording energy amount in order to acquire an intended diffraction efficiency for the hologram A, considering a likelihood that a smaller diffraction efficiency than a diffraction efficiency expected to be obtained at a final stage when the dark response is over may be obtained.

The above measure causes unwanted radical excitation and monomer consumption, which may lead to waste of a recording capacity inherently provided in the hologram recording medium, in other words, waste of the recording capacity without being used for information recording. Also, even in a condition that the monomers are not contributed to the interference fringe pattern formation, the residual monomer amount is obviously decreased. As a result, the recording sensitivity may be lowered, as the aforementioned multiplex recording progresses.

In view of the above, if the recording energy amount and the recording interval time are scheduled in such a manner that the diffraction efficiency to be obtained when the dark response has sufficiently progressed attains an intended value by e.g. using a sufficiently large recording interval time, substantially the same diffraction efficiency as in a condition before the multiplex recording progresses can be obtained with a less irradiation energy. The above arrangement also enables to reduce the monomer consumption rate, which enables to suppress lowering of the recording sensitivity. Also, as the basic properties of the hologram recording material are elucidated by a manufacturer developing and/or manufacturing the material, the reaction rate inherent to the material can be grasped. Thus, it is easy to perform scheduling recording including a dark response characteristic such as dependency on recording energy amount and dependency on recording light intensity.

In the case, however, M/# is increased by increasing the recording interval time, the data transfer rate may be unduly decreased, which may resultantly increase a recording time in a hologram recording system. On the other hand, the embodiment of the invention is directed to changing the recording interval time depending on a change in reaction rate of the hologram recording medium, as well as changing the recording energy amount. Concerning the materials tested by the inventors, the following conditions in two stages were substantially observed.

Multiplex Recording Initial Stage:

In this stage, since the recording sensitivity is high, the recording energy amount required for forming a hologram having an intended diffraction efficiency can be reduced. In this stage, the residual monomers abundantly exist, and the dark response is significantly small. Accordingly, the time required from recording by light irradiation to hologram formation i.e. the response time is short, and the reaction rate is large.

Multiplex Recording Late Stage:

In this stage, since the recording sensitivity is lowered, the recording energy amount required for forming a hologram having an intended diffraction efficiency is increased. In this stage, since the residual monomers are decreased, the recording energy amount required for obtaining an intended diffraction efficiency is increased. As a result, the time constant at which the dark response progresses is increased, the reaction time is increased, and the reaction rate is decreased.

As mentioned above, the inventors found that, concerning a certain recording area, in the initial stage of multiplex recording, the reaction rate is large, and as the multiplicity is increased, the reaction rate is decreased. Specifically, in the aforementioned multiplex recording of thirty-one times, about one second is required for formation of the first hologram; about five seconds are required for formation of the tenth hologram; and about thirty to thirty-five seconds are required for formation of the twentieth hologram and thereafter, from the point of time when light irradiation for the corresponding hologram recording is terminated, to form a hologram having a diffraction efficiency of 0.01 (=optical power of diffraction beam/optical power of reference beam), with use of an optical power density of irradiation light of e.g. 20 mW/cm$^2$. In other words, in the case where scheduling recording is performed with use of a predetermined recording interval time e.g. 5 seconds, an unduly long recording interval time is required after the multiplex recording has passed the initial stage and entered the intermediate stage. To make the matter worse, a recording interval time required for hologram formation cannot be secured after the multiplex recording has passed the intermediate stage and entered the late stage.

If the relation between the multiplicity number and the reaction rate, as described in the embodiment, is expressed in a more general language, the relation can be expressed by an accumulated recording energy amount and a reaction rate. Specifically, the reaction rate with respect to a recording area during multiplex recording does not substantially depend on the multiplicity number, but depends on the amount of a pigment i.e. a given accumulated recording energy amount, which resultantly determines the amount of residual monomers in a certain recording area of the hologram recording medium, or photopolymerization reaction.

Based on the above examination results and observations, the inventors made a comparison between a case where the recording interval time was changed depending on the reaction rate, specifically, the recording interval time in the initial stage of multiplex recording was set to a small value, and the recording interval time in the late stage of multiplex recording was set to a large value, and a case where all the recording interval times were set equal to each other, by setting the total recording time required for the multiplex recording including the recording interval times to a fixed value, to confirm an effect of the embodiment of the invention that the capacity of the recording medium i.e. M/# can be enhanced without lowering a data transfer rate. The comparison results are shown in FIGS. 6A and 6B.

Figure 6A:
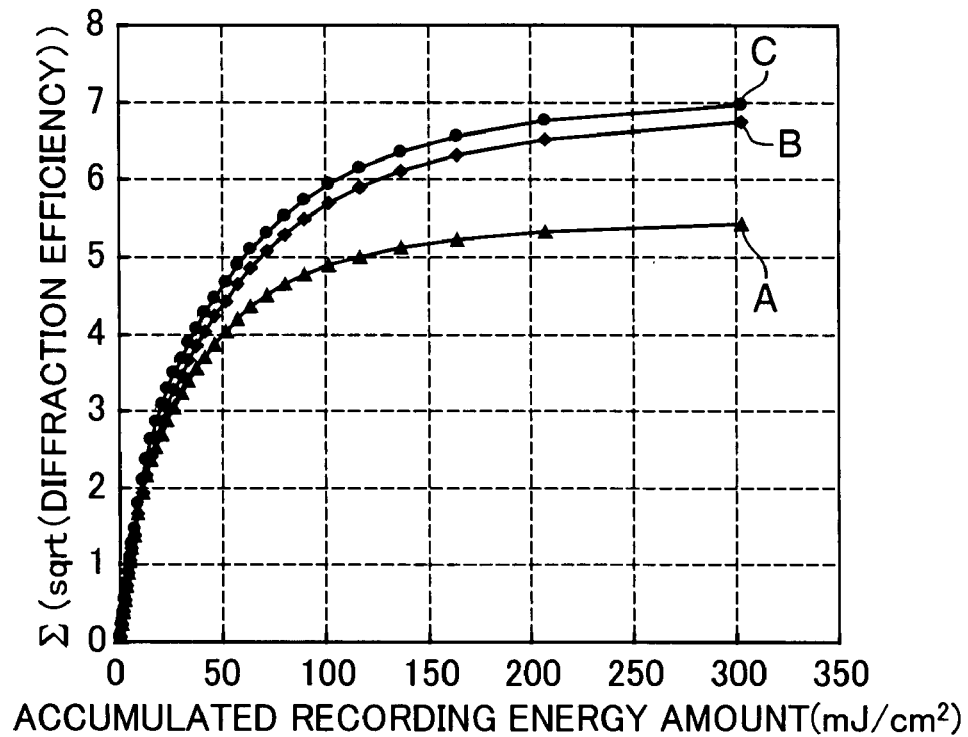
FIG. 6A is a graph showing a recording characteristic in the case where a condition on a recording interval time is changed.
Figure 6B:
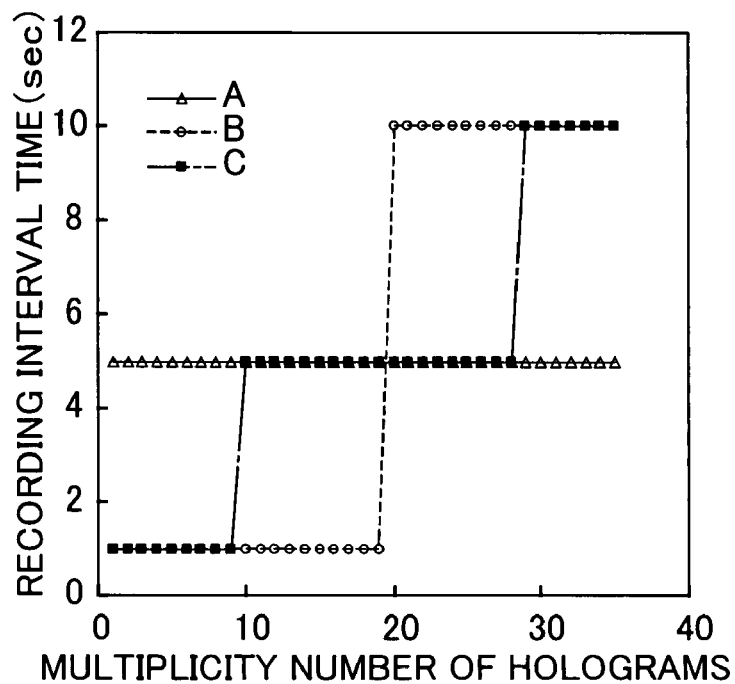
FIG. 6B is a graph schematically showing a relation between the multiplicity number of holograms, and a recording interval time.

FIG. 6A is a graph showing recording characteristics in the case where the recording interval time is changed. FIG. 6B is a graph schematically showing a relation between the multiplicity number of holograms, and the recording interval time. Referring to FIG. 6A, the axis of abscissas represents an accumulated recording energy amounts, and the axis of ordinate represents a value obtained by integrating square roots of individual diffraction efficiencies of the multiplex-recorded holograms. The respective saturation (peak) points on the axis of ordinate represent M/#. Referring to FIG. 6B, the axis of abscissas represents the multiplicity number of holograms, and the axis of ordinate represents the recording interval time. As a hologram recording condition, multiple recording was performed to form a hologram with a significantly small diffraction efficiency of about 0.05 i.e. with a less recording energy amount, based on a presumption that the above condition may advantageously provide an effect concerning control of the recording interval time.

Under each of the conditions "A", "B", and "C" shown in FIG. 6A, thirty-five holograms were recorded by an angular multiplexing recording, with use of a recording interval time as a parameter. The irradiation energy scheduling was the same under all the three conditions. As shown in FIGS. 6A and 6B, the recording interval time was fixed to e.g. 5 seconds in the condition "A". In the condition "B", the recording interval time was changed in two stages in such a manner that the recording interval time was set to one second during the recording from the multiplicity number 1 to the multiplicity number 19 i.e. until the accumulated recording energy amount reached about 35 mJ/cm$^2$, and then, the recording interval time was set to ten seconds during the recording from the multiplicity number 20 to the multiplicity number 35. In the condition "C", the recording interval time was changed in three stages in such a manner that: the recording interval time was set to one second during the recording from the multiplicity number 1 to the multiplicity number 9 i.e. until the accumulated recording energy amount reached about 7 mJ/cm$^2$; the recording interval time was set to five seconds during the recording from the multiplicity number 10 to the multiplicity number 28 i.e. until the accumulated recording energy amount reached about 90 mJ/cm$^2$; and then, the recording interval time was set to ten seconds during the recording from the multiplicity number 20 to the multiplicity number 35. Thus, the time required for completing multiplex recording of the thirty-five holograms in each of the conditions "A", "B", and "C" can be set to a substantially same time e.g. about 175 seconds.

As is obvious from the graph shown in FIG. 6A, as compared with the condition "A" where the recording interval time was set to a fixed value, the conditions "B" and "C" where the recording interval time was changed stepwise are advantageous in enhancing M/#. Also, in the initial stage of multiplex recording, i.e. in a stage when the accumulated recording energy amount was small, a significantly large difference was not observed between the case where the recording interval time was set to one second i.e. the conditions "B" and "C", and the case where the recording interval time was set to five seconds i.e. the condition "A". This is because, as described above, despite the residual monomers abundantly exist in the hologram recording medium, a dark response is significantly small because the dark response has dependency on recording energy amount. As a result, a reaction time from recording by light irradiation to hologram formation is short.

Further, concerning the late stage of multiplex recording, in the condition "A", the diffraction efficiency of each hologram is lowered, and the gradient of the graph is gradually decreased, with the result that the diffraction efficiency of the final hologram is lowered to about 0.005. On the other hand, in the conditions "B" and "C", the diffraction efficiency of each hologram is lowered to at most 0.035. This provides an observation concerning the samples used in the examination that the diffraction efficiency of each hologram can be sufficiently secured by providing a sufficient recording interval time depending on the reaction time/reaction rate in a stage of multiplex recording where the accumulated recording energy amount reaches about 90 mJ/cm$^2$.

In this way, scheduling recording depending on the reaction rate of the hologram recording medium is advantageous in enhancing M/#. Specifically, performing a control on the recording interval time depending on the reaction rate of the hologram recording medium, which is a feature of the embodiment, e.g. decreasing the recording interval time in the initial stage of multiplex recording, and increasing the recording interval time in the late stage of multiplex recording enables to make an average data transfer rate substantially equal to or faster than that in the conventional art, while suppressing lowering of M/#.

As described above, the inventors propose, as an approach for scheduling recording in the hologram multiplex recording, changing a duration i.e. a recording interval time from the point of time when light irradiation is started to record one of the holograms to the point of time when light irradiation is started to record a succeeding hologram, as well as changing the individual recording energy amounts for recording the holograms. In particular, as an approach for changing the recording interval time, the inventors propose scheduling a hologram recording interval including the recording interval time depending on the reaction rate of the hologram recording medium, in addition to changing an irradiation time in scheduling the recording energy amount (=recording light intensity×irradiation time) required for hologram recording, which has been practiced conventionally. This enables to realize large-capacity recording without impairing an increased data transfer rate, which is a primary feature of the hologram recording.

The embodiment describes an example, in which the recording interval time i.e. a progress degree of multiplex recording is changed in two stages i.e. an initial stage and a late stage, or three stages i.e. an initial stage, an intermediate stage, and a late stage. The technique of changing the recording interval time is not limited to the above. For instance, substantially the same effect as in the embodiment can be obtained by changing the recording interval time in association with an increase in multiplicity.

For instance, the scheduling may be performed in such a manner that the recording interval time is constantly increased, as the multiplex recording proceeds from the initial stage toward the late stage. Specifically, concerning holograms for multiplex recording, assuming that a duration from the point of time when the N-th hologram is recorded to the point of time when the (N+1)-th hologram is recorded is $t_{(N)}$ and a duration from the point of time when the (N+1)-th hologram is recorded to the point of time when the (N+2)-th hologram is recorded is $t_{(N+1)}$, the recording interval time may be determined to satisfy the relation: $t_{(N)} \leq t_{(N+1)}$. For instance, the hologram recording system can be easily configured by defining merely a change ratio or a change amount of the recording interval time depending on the hologram recording medium.

As described above, the embodiment is advantageous in preventing lowering of M/# by scheduling recording without lowering the data transfer rate, and in realizing a large-capacity and high-speed hologram recording by efficiently utilizing the potential recording capacity inherently provided in the hologram recording medium.

In the embodiment, the duration from the point of time when the N-th hologram is recorded to the point of time when the (N+1)-th hologram is recorded corresponds to a duration from the point of time when light irradiation is started to record the N-th hologram to the point of time when light irradiation is started to record the (N+1)-th hologram. Alternatively, a duration from the point of time when light irradiation is terminated to record the N-th hologram to the point of time when light irradiation is started to record the (N+1)-th hologram may be used.

In the examination, the multiplex recording was performed by using the photopolymer manufactured by Aprilis. In an actual hologram recording system, a hologram recording/reproducing system may be configured with use of a variety of recording materials. In the actual practice, substantially the same effect as in the embodiment can be expected, by using the aforementioned stepwise change in recording interval time, based on the properties of the materials constituting the hologram recording medium.

The embodiment, as mentioned above, uses a material having a property that the reaction rate of the hologram recording medium is decreased, as the multiplex recording proceeds from the initial stage toward the late stage. The embodiment is not limited to the approach of scheduling the multiplex recording by changing the recording interval time depending on the reaction rate, in addition to changing the recording energy amount, which is a feature of the embodiment. For instance, it is possible to design the material which satisfies a requirement that the reaction rate is increased, as the multiplex recording proceeds from the initial stage toward the late image, by e.g. controlling the sensitivity characteristic or the reaction rate through material development. In the modification, for instance, the scheduling may be performed in such a manner that the recording interval time is decreased stepwise or continuously i.e. each time the multiplicity is increased, as the multiplex recording proceeds from the initial stage to the late stage.

In the embodiment, an examination result on a two light flux interference system is described to simplify the description. Alternatively, substantially the same effect as in the embodiment can be obtained in a two-dimensional data hologram recording, using a signal beam carrying two-dimensional data, and a reference beam. In the embodiment, an angular multiplexing system is described as an example of the multiplexing system. Alternatively, the embodiment of the invention may be applied to various hologram multiplex recording systems such as wavelength multiplexing, phase code multiplexing, peristrophic multiplexing, and polytopic multiplexing.

In the embodiment, hologram multiplex recording of thirty-one times is described to examine the angular multiplexing recording system. Alternatively, it is possible to multiplex record/reproduce holograms having an intended diffraction efficiency several hundred times to several thousand times, by properly scheduling the recording energy amount and the recording interval time.

Second Embodiment

Figure 7:
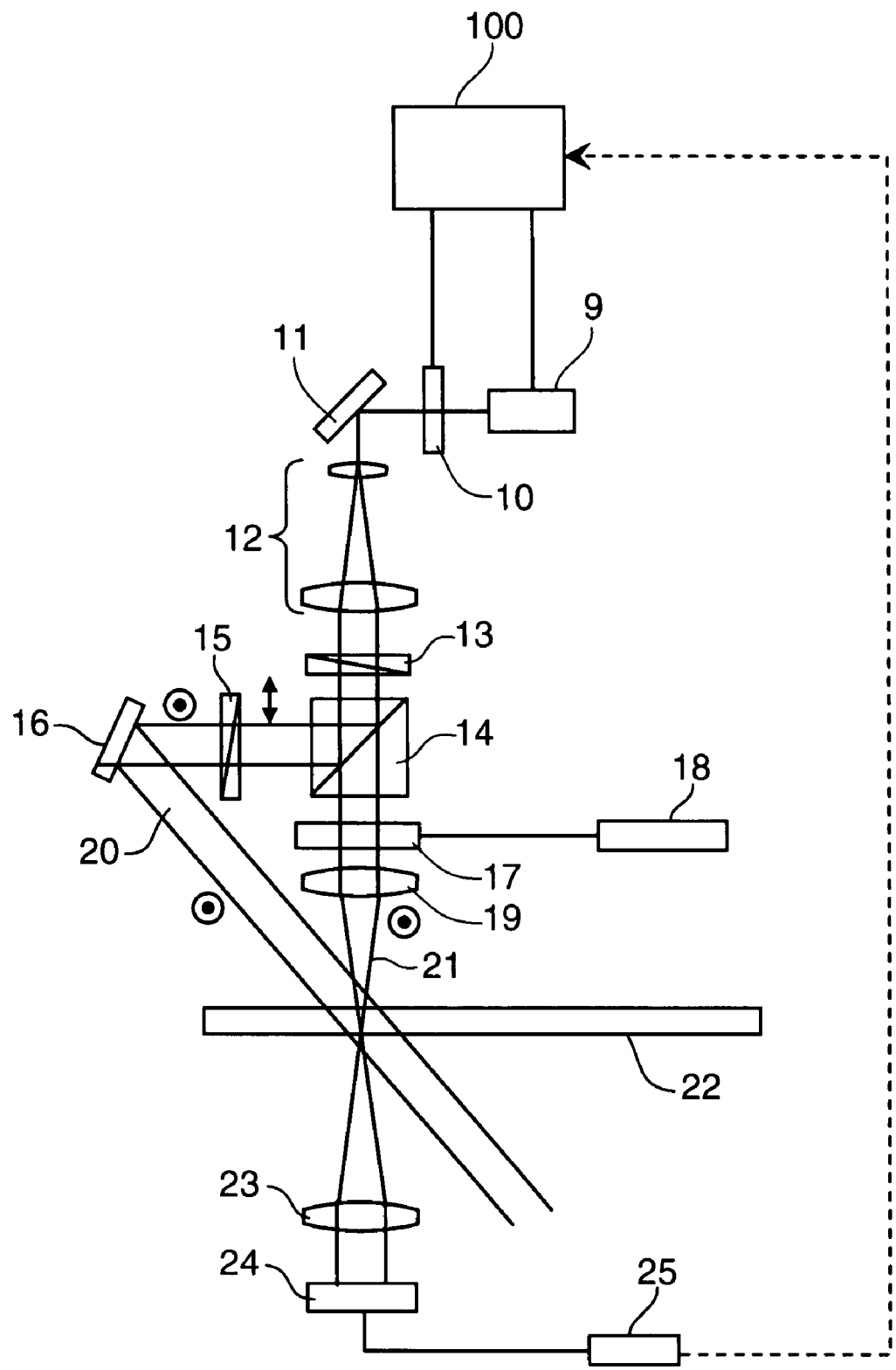
FIG. 7 is a diagram showing an arrangement of a hologram recording/reproducing apparatus in a second embodiment of the invention.

In a second embodiment of the invention, a hologram multiplex recording method for multiplex recording holograms by actually scheduling recording is described. FIG. 7 is a diagram showing an arrangement of a hologram recording/reproducing apparatus for realizing the hologram multiplex recording method described in the first embodiment. The hologram recording/reproducing apparatus shown in FIG. 7 includes a laser light source 9, a shutter 10, mirrors 11, 16, an expanding optical system 12, half-wavelength plates 13, 15, a polarizing beam splitter (hereinafter, called as "PBS") 14, a liquid crystal panel 17, an input signal controller 18, a condenser lens 19, a reproduction optical system 23, a two-dimensional light receiving array 24, a reproduction signal acquirer 25, and a main controller 100.

The laser light source 9 emits laser light. The shutter 10 is opened and closed to change a time for the laser light emitted from the laser light source 9 to be irradiated onto a hologram recording medium 22. The mirror 11 reflects the laser light emitted from the laser light source 9 toward the expanding optical system 12. The expanding optical system 12 transforms the laser light into parallel light having an intended beam diameter. The half-wavelength plate 13 changes the polarizing direction of the laser light.

The PBS 14 splits the laser light into two laser beams by transmitting a part of the laser light, while reflecting the remaining part of the laser light. The half-wavelength plate 15 changes the polarizing direction of the laser light reflected on the PBS 14. The mirror 16 reflects the laser light whose polarizing direction is changed by the half-wavelength plate 15 toward the hologram recording medium 22. The laser light reflected on the mirror 16 serves as a reference beam 20.

The liquid crystal panel 17 is an example of a spatial light modulator, and modulates the laser light transmitted through the PBS 14 into a signal beam 21 carrying two-dimensional data, while displaying an intended two-dimensional pattern. The input signal controller 18 controls the liquid crystal panel 17 to display the two-dimensional pattern, based on the two-dimensional data representing the two-dimensional pattern to be displayed. The condenser lens 19 condenses the signal beam 21 transmitted through the liquid crystal panel 17 onto the hologram recording medium 22.

The reproduction optical system 23 transforms a reproduction beam into substantially parallel beams. The two-dimensional light receiving array 24 receives the reproduction beam. The reproduction signal acquirer 25 inputs data acquired by the two-dimensional light receiving array 24, as a reproduction signal.

The main controller 100 determines a recording interval time from the point of time when light irradiation is started to record a certain hologram to the point of time when light irradiation is started to record a succeeding hologram, controls the shutter 10 to open and close based on the determined recording interval time, and changes the recording interval time for laser light irradiation. The arrangement of the main controller 100 will be described later, referring to FIG. 8.

The laser light emitted from the laser light source 9 is incident onto the expanding optical system 12 via the mirror 11, and turned into parallel light having an intended beam diameter. The parallel light is split into two beams by the PBS 14. At the beam splitting, the intensity ratio of the two beams to be split is adjustable by controlling the polarizing states of the beams to be incident onto the PBS 14 by the half-wavelength plate 13. The beams directed from the PBS 14 toward the mirror 16 has its polarization converted while being transmitted through the half-wavelength plate 15. By the polarization conversion, the beam is turned into the reference beam 20 having the same polarizing state as the polarizing state of the beam directed from the PBS 14 toward the liquid crystal panel 17, whereby the reference beam 20 is irradiated onto an intended recording area of the hologram recording medium 22.

On the other hand, the beam directed from the PBS 14 toward the liquid crystal panel 17 is turned into the signal beam 21 carrying two-dimensional data, while being transmitted through the liquid crystal panel 17 on which the intended two-dimensional pattern is displayed by the input signal controller 18. The signal beam 21 is condensed by the condenser lens 19, and irradiated onto the same area as the area where the reference beam 20 is irradiated onto the hologram recording medium 22. In this way, an interference fringe overlappingly formed on the hologram recording medium 22 by the reference beam 20 and the signal beam 21 is recorded as a hologram.

The recording energy amount to be irradiated is controlled by an opening time of the shutter 10 and an emission optical power of the laser light source 9. Also, the main controller 100 is operative to calculate a recording interval time from the point of time when light irradiation is started to record a certain hologram to the point of time when light irradiation is started to record a succeeding hologram. For instance, the main controller 100 controls the shutter 10 timewise to start an opening operation for multiplex recording the succeeding hologram.

Also, in reproducing the hologram recorded in the hologram recording medium 22, the main controller 100 controls e.g. the half-wavelength plate 13 to allow merely the reference beam 20 to be irradiated onto the area recorded with the hologram by e.g. keeping a light beam from being transmitted through the PBS 14 and directed toward the liquid crystal panel 17. The reproduction beam diffracted on the hologram is incident onto the two-dimensional light receiving array 24 via the reproduction optical system 23. The two-dimensional light receiving array 24 converts the incident reproduction beam into two-dimensional image data for outputting to the reproduction signal acquirer 25. The reproduction signal acquirer 25 receives the two-dimensional image data outputted from the two-dimensional light receiving array 24 to reproduce the two-dimensional data.

Figure 8:
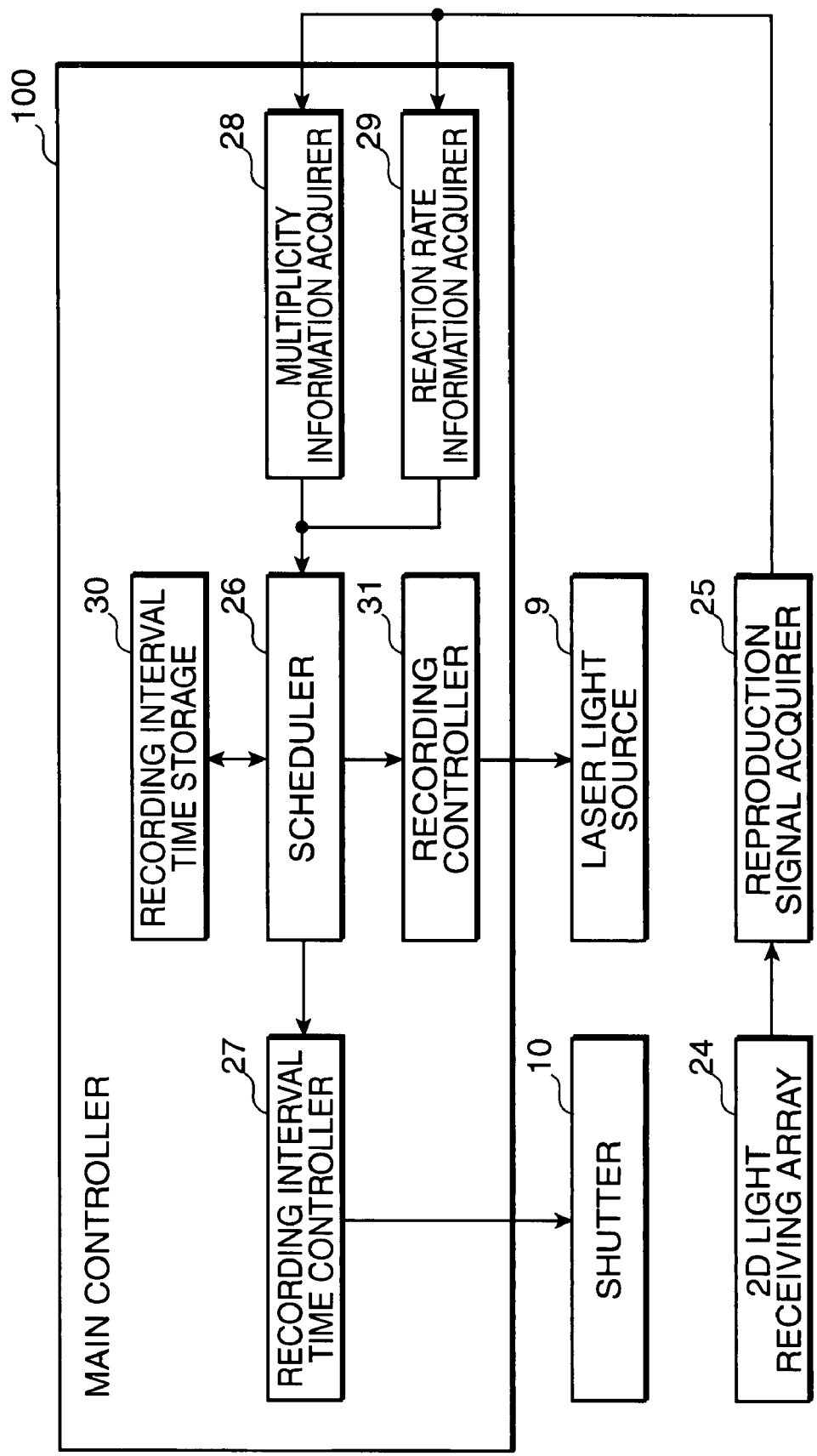
FIG. 8 is a diagram showing an arrangement of a controller shown in FIG. 7.

In the following, the arrangement of the main controller 100 shown in FIG. 7 is described in detail. FIG. 8 is a diagram showing a detailed arrangement of the main controller 100 shown in FIG. 7. The main controller 100 shown in FIG. 8 includes a scheduler 26, a recording interval time controller 27, a multiplicity information acquirer 28, a reaction rate information acquirer 29, a recording interval time storage 30, and a recording controller 31.

The multiplicity information acquirer 28 acquires multiplicity information representing the multiplicity number concerning a recording area for recording holograms. Specifically, the multiplicity information is recorded in a certain area of the hologram recording medium. The multiplicity information is read out by the two-dimensional light receiving array 24 and the reproduction signal acquirer 25, by causing the reference beam to be irradiated onto the area recorded with the multiplicity information. The readout multiplicity information is outputted to the multiplicity information acquirer 28.

The reaction rate information acquirer 29 acquires reaction rate information representing a reaction rate at which a hologram having an intended diffraction efficiency is formed for recording in the hologram recording medium by light irradiation. Specifically, the reaction rate information is recorded in a certain area of the hologram recording medium. The reaction rate information is read out by the two-dimensional light receiving array 24 and the reproduction signal acquirer 25, by causing the reference beam to be irradiated onto the area recorded with the reaction rate information. The readout reaction rate information is outputted to the reaction rate information acquirer 29.

The recording interval time storage 30 stores therein a recording interval time in association with the reaction rate of the hologram recording medium, and the multiplicity number concerning the recording area for recording holograms. The recording interval time defined in this embodiment corresponds to a duration from the point of time when light irradiation is started to record a certain hologram to the point of time when light irradiation is started to record a succeeding hologram.

The scheduler 26 determines a recording interval time from the point of time when light irradiation is started to record a certain hologram to the point of time when light irradiation is started to record a succeeding hologram. Specifically, the scheduler 26 determines a recording interval time by reading out, from the recording interval time storage 30, the recording interval time which is stored in association with the multiplicity information acquired by the multiplicity information acquirer 28 and the reaction rate information acquired by the reaction rate information acquirer 29. The recording interval time controller 27 controls the shutter 10 to open and close, based on the recording interval time determined by the scheduler 26 to change the time for laser light irradiation.

The recording controller 31 controls the recording optical power of the laser light source 9, and controls the mirror 16 to set the angle of the reference beam to be irradiated onto the hologram recording medium for recording the hologram in the hologram recording medium.

In this embodiment, the scheduler 26 corresponds to an example of a recording interval time determining section, the recording interval time controller 27 corresponds to an example of a controlling section, the reaction rate information acquirer 29 corresponds to an example of a reaction rate information acquiring section, and the multiplicity information acquirer 28 corresponds to an example of a multiplicity information acquiring section.

In this embodiment, the scheduler 26 determines the duration from the point of time when light irradiation is started to record a certain hologram to the point of time when light irradiation is started to record a succeeding hologram, as a recording interval time. Alternatively, the scheduler 26 may determine a duration from the point of time when light irradiation is terminated to record a certain hologram to the point of time when light irradiation is started to record a succeeding hologram, as a recording interval time. Further alternatively, the scheduler 26 may determine a duration from the point of time when light irradiation is terminated to record a certain hologram to the point of time when light irradiation is terminated to record a succeeding hologram, as a recording interval time.

Figure 9:
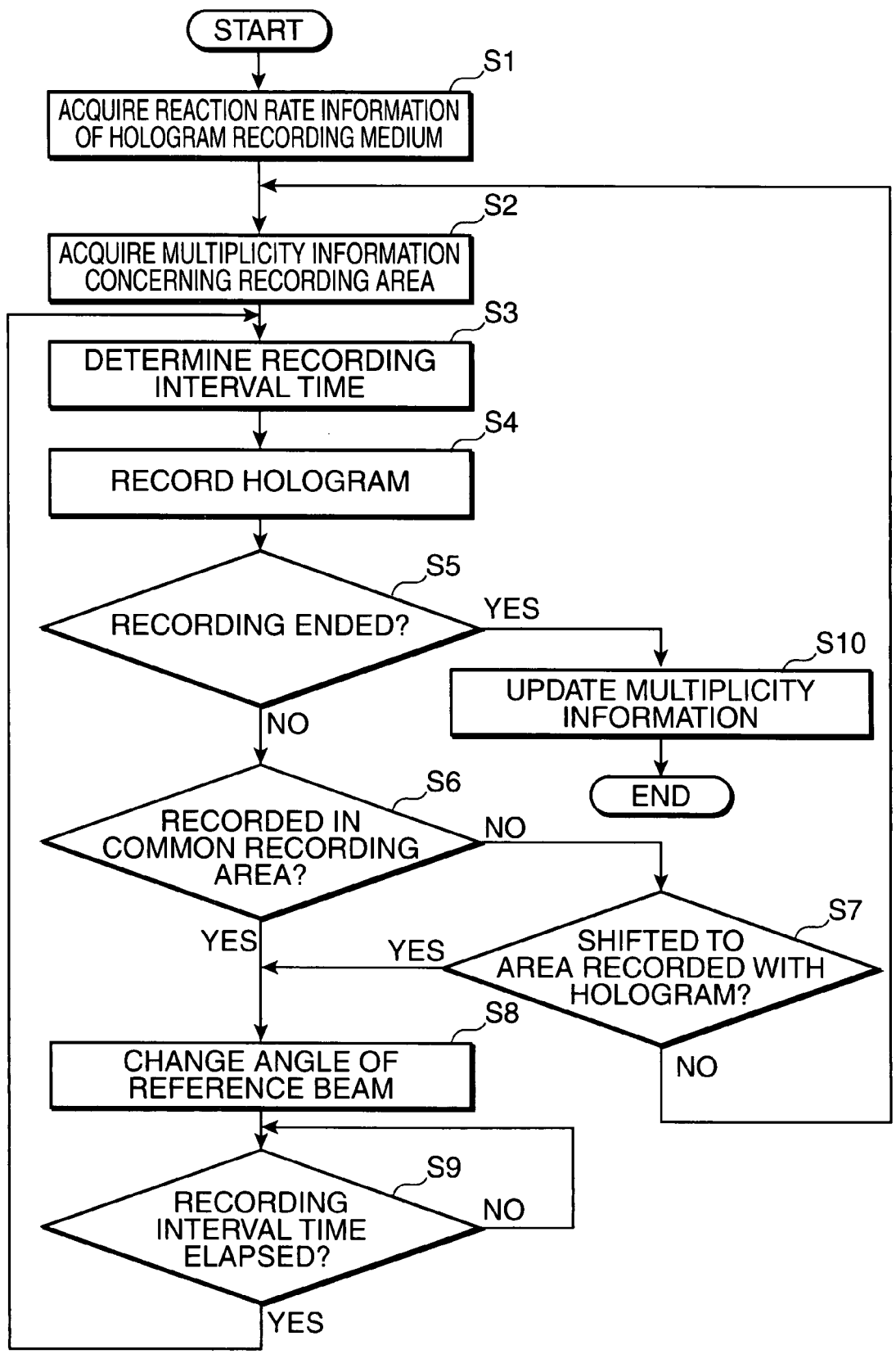
FIG. 9 is a flowchart showing a control flow to be executed in performing multiplex recording in the hologram recording/reproducing apparatus shown in FIGS. 7 and 8.

FIG. 9 is a flowchart showing a control flow to be executed in performing multiplex recording by the hologram recording/reproducing apparatus shown in FIGS. 7 and 8.

As shown in FIG. 9, before hologram recording is started, the multiplicity information concerning a certain recording area of the hologram recording medium 22, and the reaction rate information concerning the hologram recording medium 22 are acquired. First, the reaction rate information acquirer 29 acquires the reaction rate information representing the reaction rate at which a hologram having an intended diffraction efficiency is to be formed for recording in the hologram recording medium 22 by light irradiation (Step S1). The hologram recording medium 22 has an area "X" recorded with the reaction rate information, besides a data recording area. The reaction rate information can be read out from the area "X" by the two-dimensional light receiving array 24 and the reproduction signal acquirer 25 in the similar manner as reproducing the hologram.

Then, the multiplicity information acquirer 28 acquires the multiplicity information representing the multiplicity number of the hologram to be recorded in the certain recording area (Step S2). The multiplicity information concerning the hologram recording medium 22 is pre-recorded in e.g. the hologram recording medium 22, and can be read out in the similar manner as acquiring the reaction rate information. Specifically, for instance, the hologram recording medium 22 has an area "Y" recorded with the multiplicity information, besides the data recording area. The multiplicity information can be read out from the area "Y" by the two-dimensional light receiving array 24 and the reproduction signal acquirer 25 in the similar manner as reproducing the hologram.

The multiplicity information and the reaction rate information are fedback to the scheduler 26 to execute a computation on scheduling recording including the recording energy amount and the recording interval time.

Specifically, the scheduler 26 determines a recording interval time, based on the multiplicity information acquired by the multiplicity information acquirer 28 and the reaction rate information acquired by the reaction rate information acquirer 29 (Step S3). Specifically, the scheduler 26 determines the recording interval time as scheduling data by reading out, from the recording interval time storage 30, the recording interval time which is stored in association with the multiplicity information and the reaction rate information.

The recording interval time controller 27 e.g. electrically controls an opening operation of the shutter 10, based on the scheduling data to perform hologram multiplex recording with respect to a common recording area in accordance with an intended scheduling.

Specifically, the recording interval time controller 27 controls the shutter 10 to perform an opening operation for hologram recording (Step S4). Then, the recording interval time controller 27 judges whether recording of all the data to be recorded has been completed, and accordingly, the hologram recording is allowed to be terminated (Step S5). If, it is judged that the hologram recording is not to be terminated (NO in Step S5), the recording interval time controller 27 judges whether a hologram is to be recorded in the common recording area (Step S6). If, it is judged that no hologram is to be recorded in the common recording area (NO in Step S6), the recording interval time controller 27 judges whether a succeeding recording area after shifting is a recording area recorded with a hologram (Step S7). Then, if it judged that the succeeding recording area is not a recording area recorded with a hologram (NO in Step S7), the routine returns to Step S2 to acquire the multiplicity information concerning the succeeding recording area for recording a hologram in the succeeding recording area.

If, on the other hand, a hologram is to be recorded in the common recording area (YES in Step S6), or if it is judged that the succeeding recording area is a recording area recorded with a hologram (YES in Step S7), the recording controller 31 is operative to change the incident angle of the reference beam onto the hologram recording medium 22 (Step S8).

Then, the recording interval time controller 27 judges whether the recording interval time determined by the scheduler 26 has elapsed (Step S9). If it is judged that the recording interval time has not elapsed (NO in Step S9), the judgment in Step S9 is cyclically repeated until the recording interval time lapses.

The scheduler 26 determines the position of the recording area of the hologram recording medium where a targeted hologram is to be recorded, and the point of time when a laser beam is started to be irradiated for recording the hologram, in addition to the recording interval time for hologram recording. The information relating to the recording position, the point of time when the light irradiation is started and recording interval time are stored into an RAM. With this arrangement, the recording interval time controller 27 is allowed to judge whether a hologram is to be recorded in the same recording area, and also allowed to judge whether the succeeding recording area after shifting is a recording area recorded with a hologram, based on the position information. Also, the recording interval time controller 27 is enabled to judge whether the recording interval time has elapsed based on the point of time when the light irradiation is started and the current time.

If, on the other hand, it is judged that the recording interval time has elapsed (YES in Step S9), the recording interval time controller 27 terminates the hologram recoding by closing the shutter 10, and the routine returns to Step S3. Then, the recording interval time controller 27 determines a recording interval time to record a succeeding hologram. In this embodiment, each time a hologram is recorded, the recording position, the point of time when the light irradiation is started and the recording interval time are determined. Alternatively, after the recording positions, the points of time when the light irradiation is started and the recording interval times concerning multiple holograms are determined, the holograms may be successively recorded depending on the determined recording positions, the points of time when the light irradiation is started and the determined recording interval times. In the modification, the recording interval times for hologram recording are determined in Step S3. If it is judged that the recording interval time has elapsed in Step S9, the routine returns to Step S4 to record a succeeding hologram.

If, in Step S5, it is judged that the hologram recording is to be terminated (YES in Step S5), the recording controller 31 updates the multiplicity information (Step S10). In other words, the recording controller 31 updates the multiplicity information concerning the recording area where the multiplex recording has been performed in recording data.

As shown in FIG. 9, in the condition i.e. the time zone during which the multiplex recording with respect to the common recording area is not allowed because of the recording interval time, shifting to a succeeding recording area and hologram recording in the succeeding recording area may be performed, or a preparatory operation for a succeeding multiplex recording such as reference beam angle adjustment with respect to the common recording area may be performed. The scheduling recording and control operation including the recording interval time control with respect to the recording area do not interfere with any operation of the hologram recording/reproducing apparatus, other than controlling the multiplex recording with respect to the recording area within the recording interval time.

In this embodiment, the recording energy amount is set to a fixed value, and merely the recording interval time is changed. Alternatively, the recording energy amount may be changed, in addition to the recording interval time. Specifically, in the modification, the scheduler 26 determines the recording energy amount for recording each hologram, as well as the recording interval time. In the modification, the controller 100 of the hologram recording/reproducing apparatus further includes a recording energy amount storage for storing a recording energy amount in association with the reaction rate of the hologram recording medium, and the multiplicity number concerning a recording area for recording holograms. Specifically, the scheduler 26 determines a recording energy amount by reading out, from the recording energy amount storage, the recording energy amount which is stored in association with the multiplicity information acquired by the multiplicity information acquirer 28 and the reaction rate information acquired by the reaction rate information acquirer 29. The recording interval time controller 27 controls the laser light source 9 to emit light in accordance with the recording energy amount determined by the scheduler 26.

This embodiment describes a case that the reaction rate information concerning the hologram recording medium 22 is recorded in the hologram recording medium 22. Alternatively, for instance, the reaction rate information concerning the hologram recording medium 22 may be stored in the hologram recording/reproducing apparatus, as known information.

FIG. 10 is a block diagram showing a schematic arrangement of a hologram recording/reproducing apparatus as a modification in the second embodiment of the invention. A controller 100 shown in FIG. 10 includes a scheduler 26, a recording interval time controller 27, a multiplicity information acquirer 28, a reaction rate information acquirer 29, a recording interval time storage 30, a recording controller 31, an identification information acquirer 32, and a reaction rate information storage 33. Description on the elements of the controller 100 of the hologram recording/reproducing apparatus shown in FIG. 10 which are identical or equivalent to those in FIG. 8 is omitted herein.

The identification information acquirer 32 acquires identification information for identifying the hologram recording medium. Specifically, the identification information is recorded in a certain area of the hologram recording medium. The identification information is read out by a two-dimensional light receiving array 24 and a reproduction signal acquirer 25, by causing a reference beam to be irradiated onto the area recorded with the identification information. The readout identification information is outputted to the identification information acquirer 32.

The reaction rate information storage 33 stores therein the identification information and the reaction rate information in association with each other. The reaction rate information acquirer 29 acquires the reaction rate information by reading out, from the reaction rate information storage 33, the reaction rate information which is stored in association with the identification information acquired by the identification information acquirer 32. In this modification, the reaction rate information 33 corresponds to an example of a reaction rate information storing section.

In the arrangement of the modification, merely recording and saving the simplified identification information inside or on a surface of the hologram recording medium 22 is advantageous in reducing the production cost of the hologram recording medium, and enhancing manufacturing throughput.

Alternatively, the reaction rate information, the multiplicity information, the recording interval time information, and the identification information of the hologram recording medium may be recorded on a surface of a cartridge for accommodating the hologram recording medium. Further alternatively, a memory or a like device recorded with the reaction rate information, the multiplicity information, the recording interval time information, and the identification information may be provided on a surface of the hologram recording medium, or on a surface of or inside the cartridge.

Figure 11A:
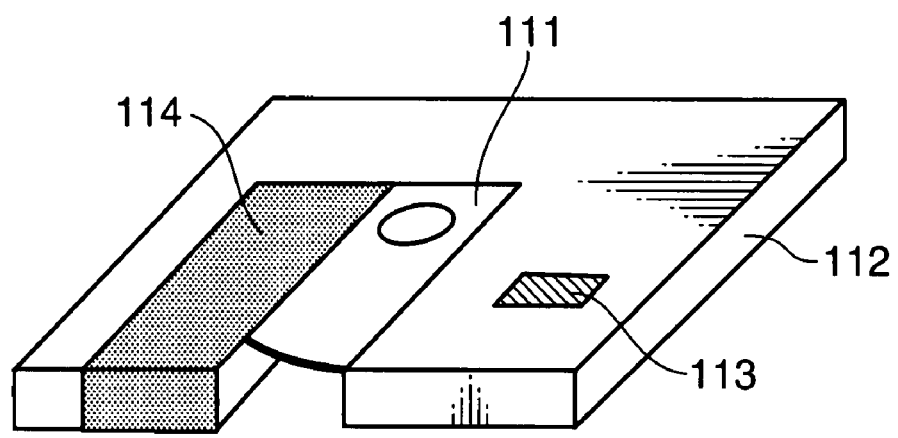
FIG. 11A is a diagram showing an external appearance of a hologram recording medium accommodated in a cartridge.
Figure 11B:
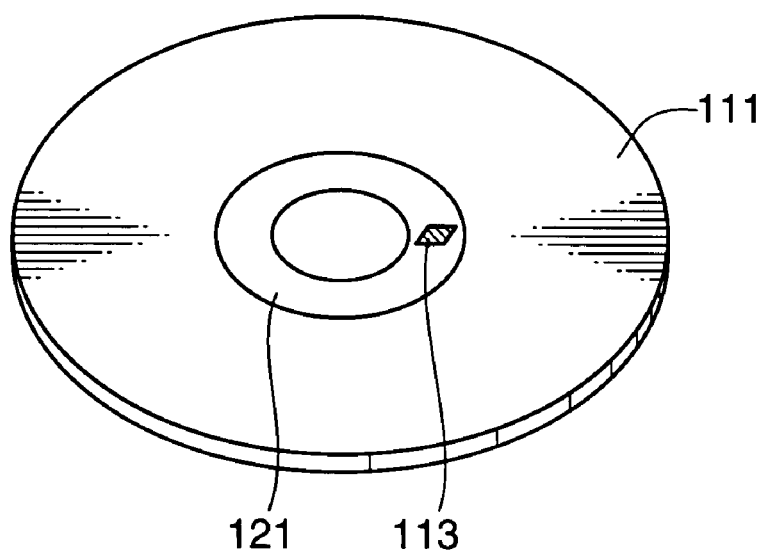
FIG. 11B is a diagram showing an external appearance of a hologram recording medium provided with a memory on a surface thereof.

FIG. 11A is a diagram showing an external appearance of a hologram recording medium accommodated in a cartridge. FIG. 11B is a diagram showing an external appearance of a hologram recording medium provided with a memory on a surface thereof. Referring to FIG. 11A, the hologram recording medium 111 is accommodated in the cartridge 112, and the cartridge 112 is provided with the memory 113 on a surface thereof, and an openable/closable shutter 114.

For instance, the memory 113 is recorded with reaction rate information of the hologram recording medium 111, or identification information capable of identifying the hologram recording medium 111. The information recorded in the memory 113 may be electrically or optically readable. For instance, the information recorded in the memory 113 may be optically acquired by e.g. an optical system including a readout light source, which is provided in a hologram recording/reproducing apparatus.

Alternatively, the memory 113 may be provided in the cartridge 112, or may be provided at an appropriate position on a surface of the hologram recording medium 111 accommodated in the cartridge 112. For instance, the memory 113 may be provided at an appropriate position depending on an optical system/mechanism for information readout, which is provided in e.g. a hologram recording apparatus.

Further, as shown in FIG. 11B, the memory 113 may be provided at an appropriate position on a surface of the hologram recording medium 111. In the example of FIG. 11B, the memory 113 is mounted on a clamp area 121 of an inner perimeter portion of the hologram recording medium 111. Alternatively, reaction rate information, multiplicity information, and identification information may be recorded in a BCA (Burst Cutting Area) of the hologram recording medium 111, or may be recorded in a barcode form or an equivalent form.

The reaction rate information of the hologram recording medium may include a reaction rate which is changed in time-series, as multiplex recording proceeds from an initial stage toward a late stage. In the arrangement of the modification, for instance, a computation process on scheduling can be simplified. Accordingly, the modification is advantageous in easily realizing multiplex recording with respect to hologram recording media of different kinds whose reaction rates are different one from the other.

In the embodiment, the recording interval time storage 30 stores therein the recording interval times in association with the reaction rate of the hologram recording medium, and the multiplicity number concerning the recording area for recording holograms. Alternatively, the recording interval time storage 30 may pre-store identification information for identifying the hologram recording medium, and recording interval time information representing a recording interval time which differs depending on the number of times of recording a hologram in a certain recording area of the hologram recording medium, and is optimum for the hologram recording medium, in association with each other.

Figure 12:
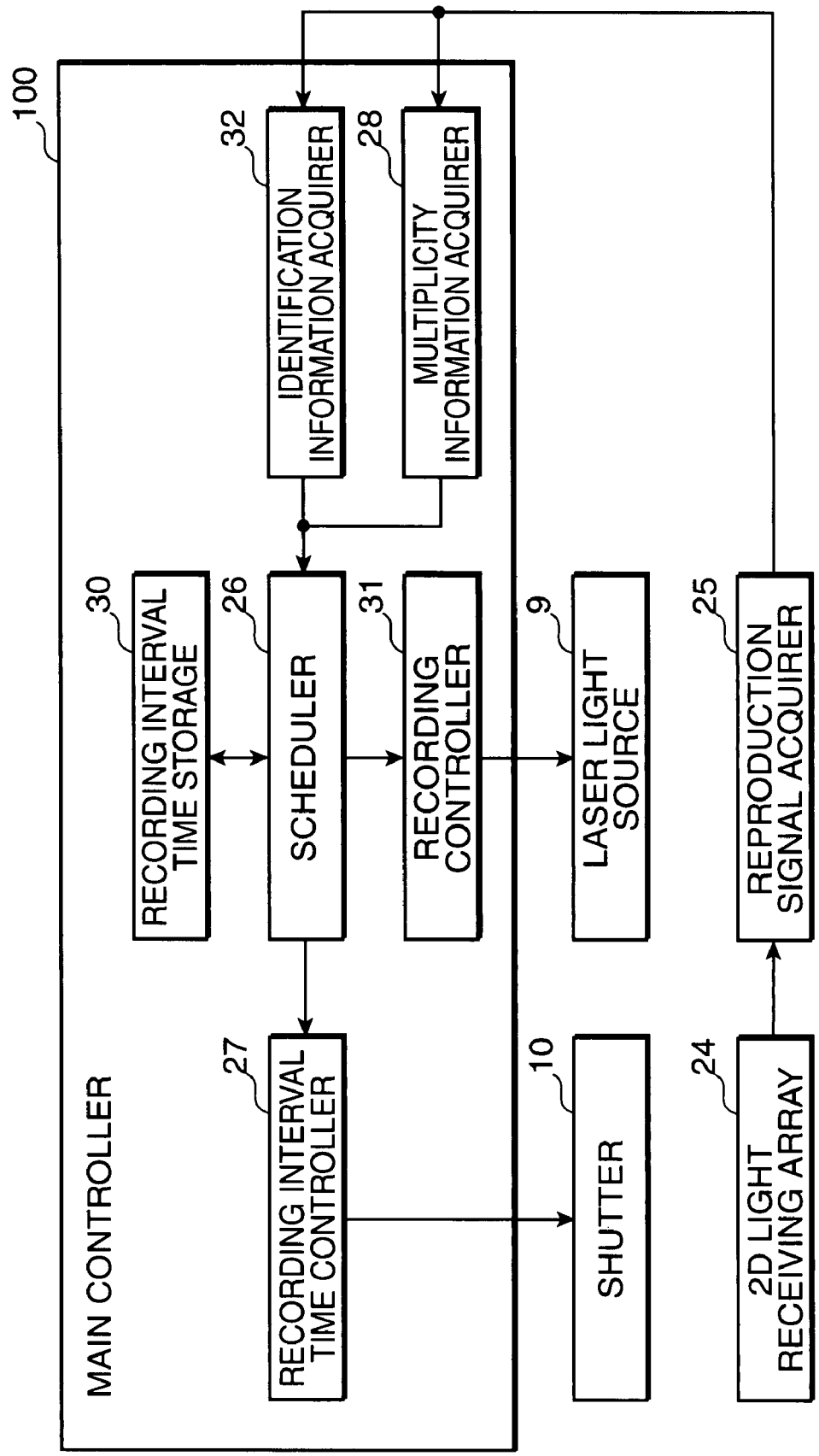
FIG. 12 is a block diagram showing a schematic arrangement of a hologram recording/reproducing apparatus as another modification in the second embodiment of the invention.

FIG. 12 is a block diagram showing a schematic arrangement of a hologram recording/reproducing apparatus as another modification in the second embodiment of the invention. A controller 100 shown in FIG. 12 includes a scheduler 26, a recording interval time controller 27, a multiplicity information acquirer 28, a recording interval time storage 30, a recording controller 31, and an identification information acquirer 32. Description on the elements of the controller 100 of the hologram recording/reproducing apparatus shown in FIG. 12 which are identical or equivalent to those in FIGS. 8 and 10 is omitted herein.

The recording interval time storage 30 pre-stores the identification information for identifying the hologram recording medium, and the recording interval time information representing a recording interval time which differs depending on the number of times of recording a hologram in a certain recording area of the hologram recording medium, and is optimum for the hologram recording medium, in association with each other. Specifically, the recording interval time storage 30 pre-stores the recording interval time information representing the recording interval time optimum for the hologram recording medium, in association with the identification information for identifying the hologram recording medium, and multiplicity information representing the number of times of recording a hologram in a certain recording area of the hologram recording medium. In this embodiment, the recording interval time storage 30 corresponds to an example of a recording interval time information storing section.

The scheduler 26 is operative to acquire, from the recording interval time storage 30, the recording interval time information which is stored in association with the identification information acquired by the identification information acquirer 32, and determines a recording interval time based on the acquired recording interval time information. Specifically, the scheduler 26 is operative to acquire, from the recording interval time storage 30, the recording interval time information which is stored in association with the identification information acquired by the identification information acquirer 32 and the multiplicity information acquired by the multiplicity information acquirer 28.

In the arrangement of the modification, merely recording and saving the simplified identification information e.g. inside or on a surface of a hologram recording medium 22 is advantageous in reducing the production cost of the hologram recording medium, and enhancing manufacturing throughput.

In the modification, the recording interval time storage 30 stores the recording interval time in association with the reaction rate of the hologram recording medium, and the multiplicity number concerning the recording area for recording holograms. Alternatively, the hologram recording medium may be recorded with the recording interval time information in association with the reaction rate of the hologram recording medium and the multiplicity number concerning the recording area for recording holograms to read out the recording interval time information from the hologram recording medium.

Figure 13:
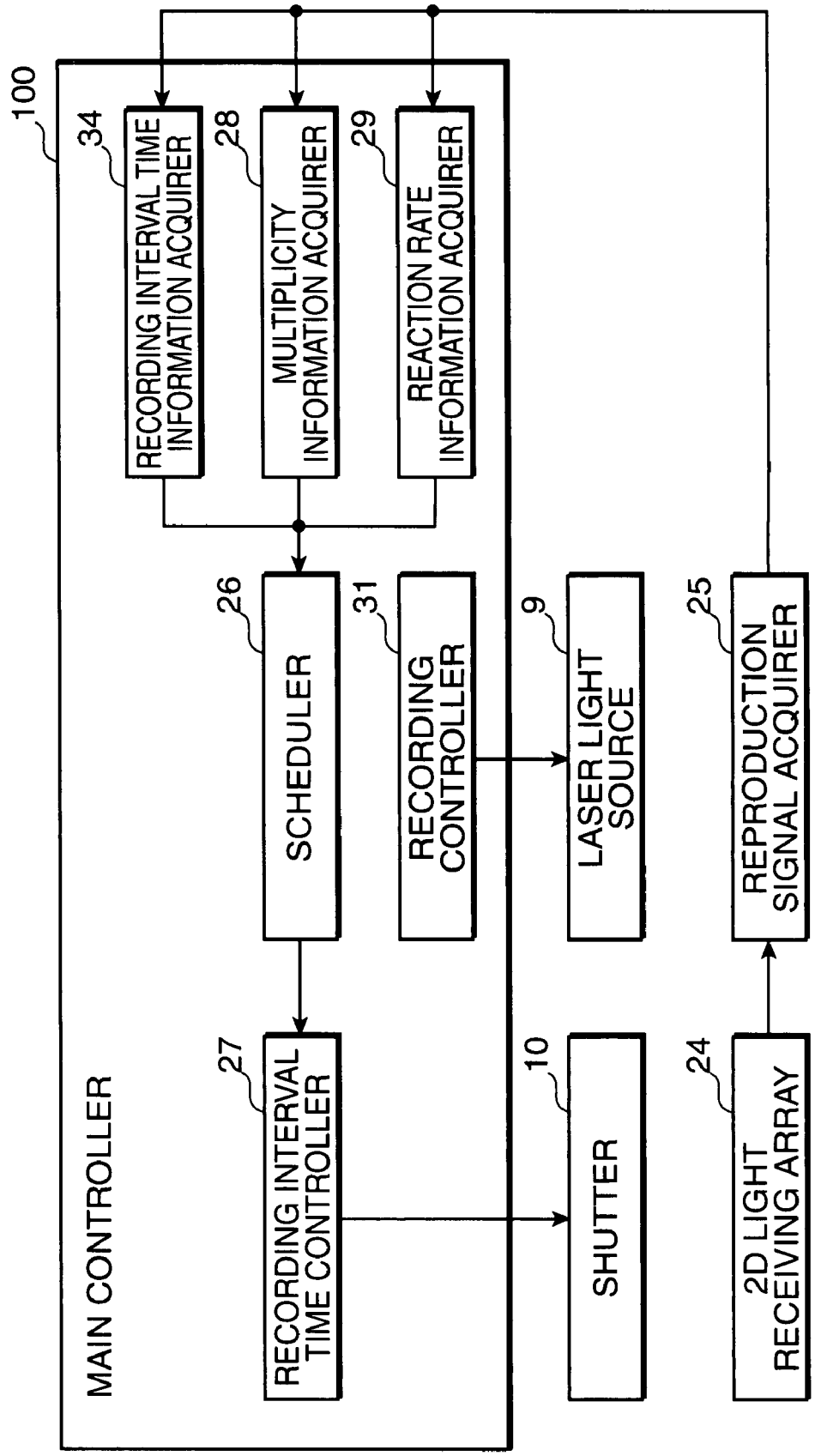
FIG. 13 is a block diagram showing a schematic arrangement of a hologram recording/reproducing apparatus as yet another modification in the second embodiment of the invention.

FIG. 13 is a block diagram showing a schematic arrangement of a hologram recording/reproducing apparatus as yet another modification of the second embodiment of the invention. A main controller 100 shown in FIG. 13 includes a scheduler 26, a recording interval time controller 27, a multiplicity information acquirer 28, a reaction rate information acquirer 29, a recording controller 31, and a recording interval time information acquirer 34. Description on the elements of the controller 100 of the hologram recording/reproducing apparatus shown in FIG. 13 which are identical or equivalent to those in FIG. 8 is omitted herein.

The recording interval time information acquirer 34 acquires, from the hologram recording medium, recording interval time information in association with a reaction rate of the hologram recording medium and the multiplicity number concerning a recording area for recording holograms. Specifically, the recording interval time information is recorded in a certain area of the hologram recording medium. The recording interval time information is read out by a two-dimensional light receiving array 24 and a reproduction signal acquirer 25, by causing a reference beam to be irradiated onto the area recorded with the recording interval time information. The readout recording interval time information is outputted to the recording interval time information acquirer 34.

The scheduler 26 determines the recording interval time in association with the multiplicity information acquired by the multiplicity information acquirer 28 and the reaction rate information acquired by the reaction information acquirer 29, by referring to the recording interval time information acquired by the recording interval time information acquirer 34.

The recording interval time information may be recorded on a surface of the hologram recording medium, or recorded on a surface of or inside the cartridge, or recorded in the memory provided for the hologram recording medium or the cartridge, in place of being recorded inside the hologram recording medium.

The above arrangement enables to eliminate the need of pre-storing the reaction rate information, the multiplicity information, and the recording interval time information in the hologram recording/reproducing apparatus, thereby enabling to simplify the arrangement of the hologram recording/reproducing apparatus.

Third Embodiment

In the first and the second embodiments, description is made on the hologram recording/reproducing apparatus and the hologram multiplex recording method that enable to enhance M/# without lowering the recording data transfer rate. In this section, an applied example of a hologram multiplexing recording method is described as a third embodiment.

In hologram multiplex recording, it is beneficial to keep a data transfer rate concerning information to be recorded to a constant level. Since the recording sensitivity is changed resulting from a change in reaction rate, which is a property inherent to a hologram recording material, it is difficult to perform multiplex recording under the same recording condition satisfying a requirement that the recording energy amount is equal to the multiplication of irradiation light power by irradiation time. Further, as described in the first embodiment, the hologram formation rate is changed, as the number of times of multiplex recording is increased. In the case where multiplex recording of such an enormously large number of times as several hundred times to several thousand times is performed, there will be a difference as large as several digits between the time required for performing the hologram multiplex recording in an initial stage, and the time required for performing the hologram multiplex recording in a late stage.

For instance, although in the initial stage of the multiplex recording of such a large multiplicity number, an extremely high-speed data transfer rate of e.g. about several ten gigabits per second may be obtained, in the late stage of the multiplex recording, the data transfer rate may be lowered by several digits, for instance, lowered to about several megabits per second. Such a large difference in data transfer rate by several digits may degrade the operability of the hologram recording/reproducing apparatus, and result in lowering stability of the hologram recording/reproducing apparatus. This may make it difficult to configure a hologram recording/reproducing system. There is proposed an idea of using a device having a high-performance and high-speed data transfer function e.g. an information processing semiconductor device or a wide channel to comply with a large data transfer rate, which is a feature of the hologram recording/reproducing. Even with use of such a device, the recording stage requiring the high performance is very small, and therefore, the cost performance is poor.

In view of the above, the inventors made a finding, as a method for recording information in a hologram recording medium, wherein an average hologram recording speed can be made substantially uniform by using an approach of building up the multiplicity number with respect to a certain recording area, with combined use of a change in recording interval time, recording region, and recording order in performing multiplex recording.

Figure 14:
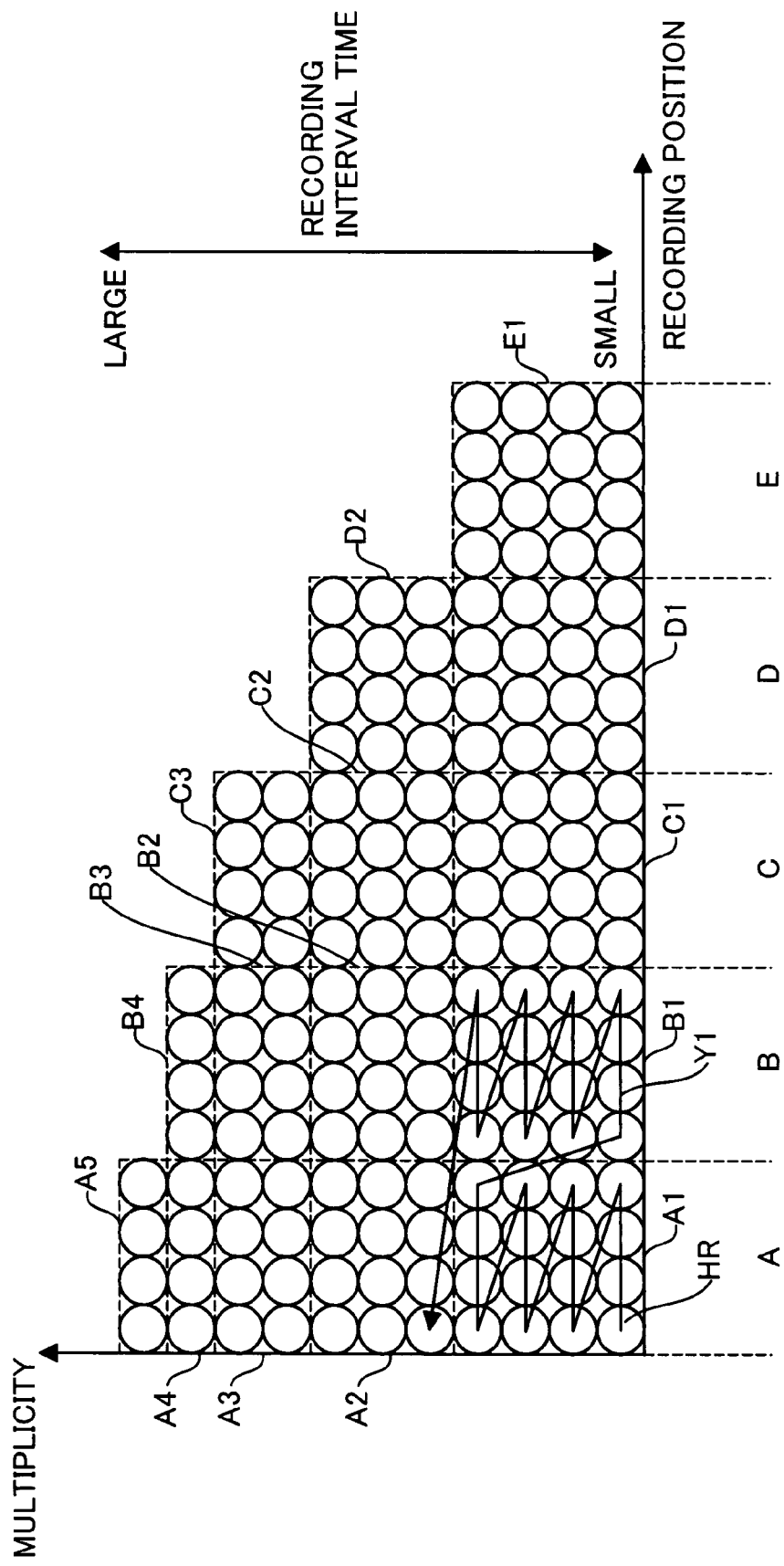
FIG. 14 is a conceptual diagram schematically showing a relation between the multiplicity of holograms to be recorded in individual recording regions, and a recording interval time required in recording the holograms, with respect to recording regions of a hologram recording medium adjacent to each other.
Figure 15:
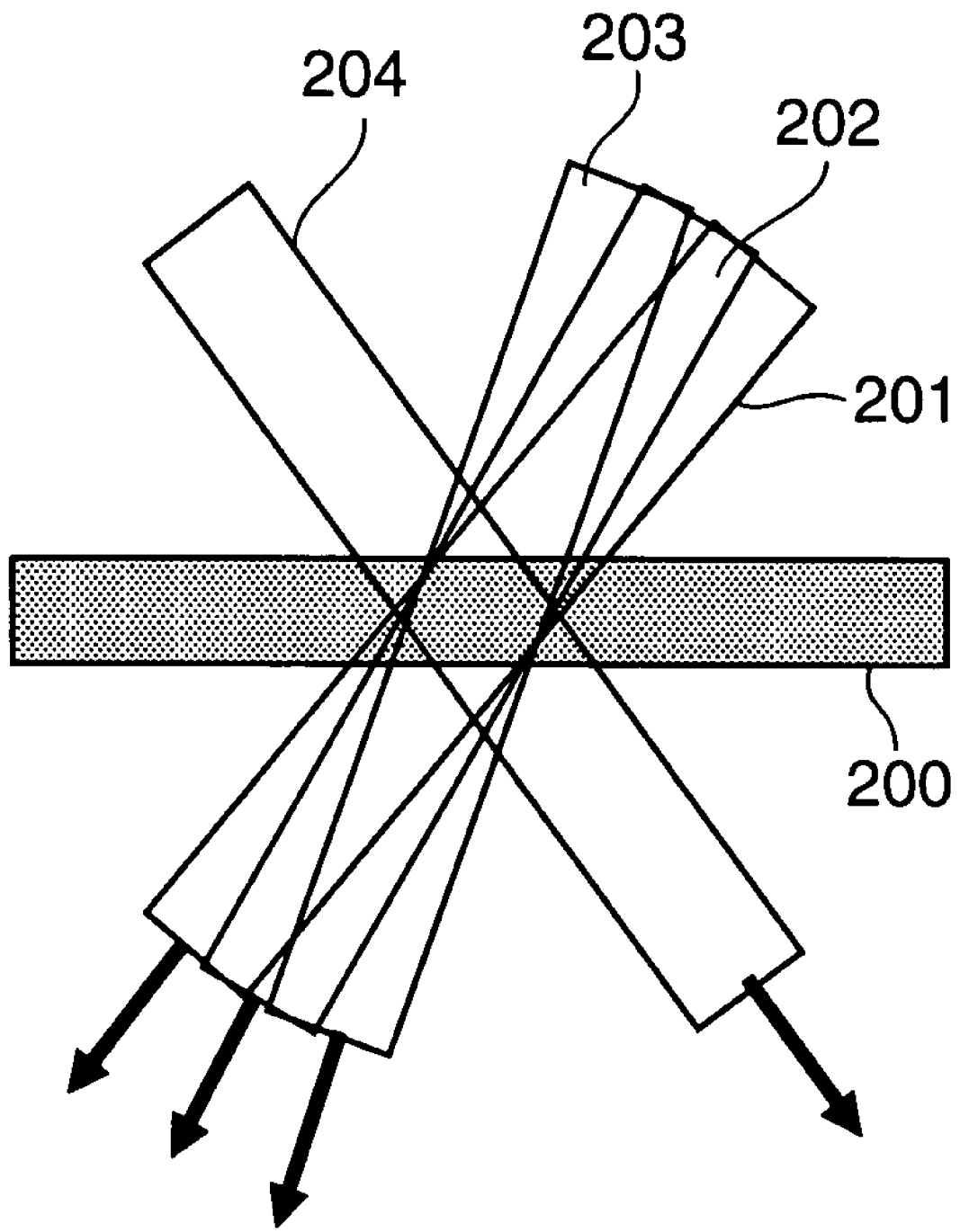
FIG. 15 is a conceptual diagram for describing a general angular multiplexing recording system.

FIG. 14 is a conceptual diagram schematically showing a relation between the multiplicity of holograms to be recorded in individual recording regions, and a recording interval time required in recording the holograms, with respect to recording regions in a hologram recording medium adjacent to each other. The recording regions are regions of a certain recording area which are physically or logically divided. In the diagram of FIG. 14, the axis of abscissas represents a recording position in the hologram recording medium, and the axis of ordinate represents the number of times (multiplicity number) of forming holograms one over the other. As the multiplicity number is increased, the recording interval time is increased, whereas, as the multiplicity number is decreased, the recording interval time is decreased.

FIG. 14 shows an arrangement of the third embodiment, wherein an average hologram recording speed i.e. a recording information transfer rate can be made substantially uniform with respect to a hologram recording medium having a large recording area, by combining recording interval time control, the recording position in the hologram recording medium, and the recording order with respect to recording regions adjacent to each other, in other words, by using a multiplicity buildup approach.

A hologram recording medium has a recording area composed of a number of recording regions each of which is adapted to record a predetermined number of holograms. In FIG. 14, for sake of easy explanation, the recording area is divided into five regions A, B, C, D, and E, and each of the five regions A, B, C, D, and E is composed of small-sized hologram recording portions "HR", wherein four small-sized hologram portions "HR" are consecutively formed into a hologram array without overlapping along the axis of abscissas, and a certain number of hologram arrays are formed one over the other. The axis of ordinate in FIG. 14 represents the multiplicity number of hologram multiplex recording to be executed, using the small-sized hologram recording portions "HR". Also, as shown in FIG. 14, the recording interval time is controlled in accordance with an increase in multiplicity number, in other words, in accordance with a change in reaction rate of the hologram recording medium, as described in the first embodiment.

For instance, the recording regions A, B, C, D, and E are divided into logical recording blocks, shown by dotted rectangles in FIG. 14, i.e. A1, A2, A3, A4, and A5; B1, B2, B3, and B4; C1, C2, and C3; D1 and D2; and E1, respectively, depending on the multiplicity number. In this arrangement, the multiplicity number may be different with respect to each of the recording blocks. The blocks A1 through A5 in the recording region A, the blocks B1 through B4 in the recording region B, the blocks C1 through C3 in the recording region C, the blocks D1 and D2 in the recording region D, and the block E1 in the recording region E have different recording interval times one from the other. For instance, in the hologram recording medium as described in the first embodiment, a recording block having a larger multiplicity number has a larger recording interval time.

The recording interval time for hologram recording in each of the recording blocks may be changed. In this embodiment, however, for sake of easy explanation, the recording interval time in each of the recording blocks is set to a fixed value. Thus, since the recording interval times for hologram recording in the recording blocks are identical to each other, there is no need of changing the recording interval time each time a hologram is recorded in the recording block having the same multiplicity number, which enables to eliminate or suppress a processing time required for determining the recording interval time.

In each of the recording blocks A1, B1, C1, D1, and E1, hologram arrays each consisting of four adjacent small-sized hologram portions "HR" are recorded one over the other four times. In each of the recording blocks A2, B2, C2, and D2, hologram arrays each consisting of four adjacent hologram portions "HR" are recorded one over the other three times. In each of the recording blocks A3, B3, and C3, hologram arrays each consisting of four adjacent hologram portions "HR" are recorded one over the other twice. In each of the recording blocks A4, A5, and B4, a hologram array consisting of four adjacent hologram portions "HR" is recorded only once.

In the above arrangement, hologram recording is performed by serially recording holograms with respect to the plural recording regions. In performing the serial recording, multiplex recording is performed by using a recording block having a shorter recording interval time, and a recording block having a longer recording interval time in combination within a certain recording area. This enables to maintain the average hologram recording speed at a substantially constant level, thereby enabling to keep the data transfer rate at a substantially constant level.

Specifically, hologram arrays are recorded in the recording block A1, followed by recording hologram arrays in the recording block B1. Then, hologram arrays are recorded in the recording block A2, followed by recording hologram arrays in the recording block C1. Thereafter, hologram arrays are recorded in the order of the recording blocks B2, A3, D1, C2, B3, A4, E1, D2, C3, and finally, a hologram array is recorded in the recording blocks B4 and A5. Thus, the holograms are recorded in such a manner that recording blocks having a smaller multiplicity number and recording blocks having a larger multiplicity number are used in combination.

As shown by the arrow Y1, in each of the recording blocks, after a hologram array of four adjacent hologram portions "HR" are consecutively recorded, another hologram array of four adjacent hologram portions "HR" are consecutively recorded over the preceding recorded hologram array. The serial recording operation is performed by the number of times corresponding to the multiplicity number of each recording block. In this way, in each of the recording blocks, the hologram array of four adjacent hologram portions "HR" are consecutively recorded in the hologram recording direction, and the hologram arrays are recorded one over the other multiple times. This enables to prioritize recording of holograms whose recording interval time is short, and whose multiplicity number is small.

The following is an advantage of the hologram multiplex recording method in the third embodiment. For instance, in the case where holograms are multiplex-recorded in a certain recording area, as mentioned above, a certain time interval is required from the point of time when a certain hologram is recorded in the recording area to the point of time when a succeeding hologram is recorded in the same recording area. In this condition, in use of a hologram recording medium having a property that the reaction rate is gradually lowered, as the multiplex recording proceeds from an initial stage toward a late image, the data transfer rate in the late stage of the multiplex recording is extremely lowered, and it takes a considerably long time until the hologram recording medium finally attains the recording capacity of the recording area. The same drawback may be involved in the case where the multiplicity number is built up while changing the recording regions in such a manner that the multiplicity numbers with respect to the recording regions are set to a substantially constant value.

On the other hand, according to the hologram multiplex recording method of the third embodiment, as well as controlling the recording regions and the recording order, the recording interval time is changed by correlating the recording block to the recording interval time with respect to individual recording regions, substantially depending on the reaction rate of the recording medium. In this arrangement, in the case where the multiplicity number in a certain recording region is increased, in other words, a long recording interval time is required until a succeeding multiplex recording is allowed, holograms are recorded in a recording block having a shorter recording interval time. This enables to maintain the data transfer rate with respect to the entirety of the hologram recording/reproducing system.

Also, in the above arrangement, the holograms are recorded first in the recording block A1 having a smallest average multiplicity number within the recording region A among the recording regions A through E. Then, the holograms are recorded in the recording block B1 having a smallest average multiplicity number within the recording region B adjacent the recording region A. Then, the holograms are recorded in the recording block A2 having a second smallest average multiplicity number within the recording region A. Thus, the recording blocks having the different recording interval times are used in combination. This enables to maintain the average hologram recording rate at a substantially constant level, thereby enabling to keep the data transfer rate at a substantially constant level.

The foregoing embodiments and/or modifications primarily include the inventions having the following arrangements.

A hologram recording/reproducing apparatus according to an aspect of the invention is a hologram recording/reproducing apparatus for recording holograms to be formed by a signal beam carrying certain two-dimensional data, and a reference beam to be emitted from a light source for emitting the signal beam in a certain recording area of a hologram recording medium multiple times, and for reproducing the recorded holograms by irradiating the reference beam. The apparatus includes: a recording interval time determining section for determining a recording interval time from the point of time when light is irradiated to record a certain hologram of the holograms to be multiplex-recorded to the point of time when light is irradiated to record a succeeding hologram in such a manner that at least parts of the holograms are recorded one over the other in the certain recording area; and a controlling section for controlling the light to be irradiated from the light source depending on the recording interval time determined by the recording interval time determining section.

A hologram multiplex recording method according to another aspect of the invention is a hologram multiplex recording method for recording holograms to be formed by a signal beam carrying certain two-dimensional data, and a reference beam to be emitted from a light source for emitting the signal beam in a certain recording area of a hologram recording medium multiple times. The method includes: a recording interval time determining step of determining a recording interval time from the point of time when light is irradiated to record a certain hologram of the holograms to be multiplex-recorded to the point of time when light is irradiated to record a succeeding hologram in such a manner that at least parts of the holograms are recorded one over the other in the certain recording area; and a controlling step of controlling the light to be irradiated from the light source depending on the recording interval time determined in the recording interval time determining step.

In the above arrangements, the recording interval time from the point of time when the light is irradiated to record the certain hologram of the holograms to be multiplex-recorded to the point of time when the light is irradiated to record the succeeding hologram is determined in such a manner that at least parts of the holograms are recorded one over the other in the certain recording area, and the light to be irradiated from the light source is controlled depending on the determined recording interval time.

With the above arrangement, the hologram having the intended diffraction efficiency is formed by changing the recording interval time from the point of time when the light is irradiated to record the certain hologram to the point of time when the light is irradiated to record the succeeding hologram in an overlap manner. This enables to prevent lowering of a dynamic range of the hologram recording medium without lowering the average data transfer rate, and to provide stabilized recording sensitivity.

In the hologram recording/reproducing apparatus, preferably, the recording interval time determining section may determine a recording energy amount with respect to each of the holograms, and the controlling section may control the light to be irradiated from the light source depending on the recording energy amount determined by the recording interval time determining section.

In the above arrangement, the recording energy amount with respect to each of the holograms is determined, and the light to be irradiated from the light source is controlled depending on the determined recording energy amount. This enables to record the holograms with a proper recording energy amount by changing the recording energy amount as well as the recording interval time.

Preferably, the hologram recording/reproducing apparatus may further include a reaction rate information acquiring section for acquiring reaction rate information representing a reaction rate at which the hologram having an intended diffraction efficiency is formed for recording in the hologram recording medium by the light irradiation, wherein the recording interval time determining section determines the recording interval time based on the reaction rate information acquired by the reaction rate information acquiring section.

In the above arrangement, the reaction rate information representing the reaction rate at which the hologram having the intended diffraction efficiency is formed for recording in the hologram recording medium by the light irradiation is acquired, and the recording interval time is determined based on the acquired reaction rate information.

Thus, the recording interval time is determined based on the reaction rate at which the hologram having the intended diffraction efficiency is formed for recording in the hologram recording medium by the light irradiation. This enables to determine an optimal recording interval time depending on the reaction rate inherent to the material composing the hologram recording medium.

In the hologram recording/reproducing apparatus, preferably, the reaction rate information acquiring section may acquire the reaction rate information representing the reaction rate which is changed in time-series, as the multiplex recording with respect to the hologram recording medium proceeds from an initial stage toward a late stage.

In the above arrangement, acquired is the reaction rate information representing the reaction rate which is changed in time-series, as the multiplex recording with respect to the hologram recording medium proceeds from an initial stage toward a late stage. This enables to simplify the process of determining the recording interval time.

Preferably, the hologram recording/reproducing apparatus may further include: a multiplicity information acquiring section for acquiring multiplicity information representing the number of times of recording the holograms in the certain recording area of the hologram recording medium, wherein the recording interval time determining section determines the recording interval time based on the multiplicity information acquired by the multiplicity information acquiring section.

In the above arrangement, the multiplicity information representing the number of times of recording the holograms in the certain recording area of the hologram recording medium is acquired, and the recording interval time is determined based on the acquired multiplicity information. This is advantageous in preventing lowering of M/# by increasing the recording interval time, as the number of times of recording the holograms in the certain recording area of the hologram recording medium is increased, and in making the average data transfer rate substantially equal to or faster than that in the conventional art.

In the hologram recording/reproducing apparatus, preferably, the recording interval time determining section may determine a duration from the point of time when the light irradiation is started to record the certain hologram to the point of time when the light irradiation is started to record the succeeding hologram, as the recording interval time.

In the above arrangement, the duration from the point of time when the light irradiation is started to record the certain hologram to the point of time when the light irradiation is started to record the succeeding hologram is determined as the recording interval time. This enables to form the hologram having the intended diffraction efficiency by changing the duration from the point of time when the light irradiation is started to record the certain hologram to the point of time when the light irradiation is started to record the succeeding hologram.

In the hologram recording/reproducing apparatus, preferably, the recording interval time determining section may determine a duration from the point of time when the light irradiation is terminated to record the certain hologram to the point of time when the light irradiation is started to record the succeeding hologram, as the recording interval time.

In the above arrangement, the duration from the point of time when the light irradiation is terminated to record the certain hologram to the point of time when the light irradiation is started to record the succeeding hologram is determined as the recording interval time. This enables to form the hologram having the intended diffraction efficiency by changing the duration from the point of time when the light irradiation is terminated to record the certain hologram to the point of time when the light irradiation is started to record the succeeding hologram.

In the hologram recording/reproducing apparatus, preferably, the recording interval time determining section may determine the recording interval time in such a manner that the recording interval time satisfies a relation:

$$t_{(N)} \leq t_{(N+1)}$$

where $t_{(N)}$ is a recording interval time from the point of time when the N-th hologram is recorded to the point of time when the (N+1)-th hologram is recorded, and $t_{(N+1)}$ is a recording interval time from the point of time when the (N+1)-th hologram is recorded to the point of time when the (N+2)-th hologram is recorded, with respect to the holograms to be multiplex-recorded.

In the above arrangement, assuming that $t_{(N)}$ is the recording interval time from the point of time when the N-th hologram is recorded to the point of time when the (N+1)-th hologram is recorded, and $t_{(N+1)}$ is the recording interval time from the point of time when the (N+1)-th hologram is recorded to the point of time when the (N+2)-th hologram is recorded, the recording interval time is determined in such a manner that the recording interval time satisfies the relation: $t_{(N)} \leq t_{(N+1)}$. This enables to easily determine the recording interval time by merely defining a change ratio or a change amount of the recording interval time depending on the hologram recording medium.

In the hologram recording/reproducing apparatus, preferably, the hologram recording medium may be pre-recorded with identification information for identifying the hologram recording medium, the apparatus may further include a reaction rate information storage for pre-storing the identification information, and the reaction rate information concerning the hologram recording medium in association with each other, and the reaction rate information acquiring section may read out the identification information from the hologram recording medium, and acquire the reaction rate information which is stored in association with the readout identification information from the reaction rate information storage.

In the above arrangement, the hologram recording medium is pre-recorded with the identification information for identifying the hologram recording medium. The reaction rate information storage pre-stores the identification information, and the reaction rate information concerning the hologram recording medium in association with each other. The identification information is read out from the hologram recording medium, and the reaction rate information which is stored in association with the readout identification information is acquired from the reaction rate information storage.

In the above arrangement, there is no need of recording the reaction rate information in the hologram recording medium by allowing the reaction rate information to be pre-stored in the reaction rate information storage in association with the identification information. This enables to easily specify the reaction rate based on the identification information of the hologram recording medium.

In the hologram recording/reproducing apparatus, preferably, the identification information may be recorded in the hologram recording medium. In this arrangement, the identification information can be read out from the interior or a surface of the hologram recording medium.

In the hologram recording/reproducing apparatus, preferably, the identification information may be recorded in a cartridge for accommodating the hologram recording medium. In this arrangement, the identification information can be read out from the interior or a surface of the cartridge for accommodating the hologram recording medium.

In the hologram recording/reproducing apparatus, preferably, the identification information may be recorded in a memory provided in a cartridge for accommodating the hologram recording medium. In this arrangement, the identification information can be read out from the memory provided on a surface of or the interior of the cartridge for accommodating the hologram recording medium.

In the hologram recording/reproducing apparatus, preferably, the identification information may be recorded in a memory provided in the hologram recording medium. In this arrangement, the identification information can be read out from the memory provided on a surface or the interior of the hologram recording medium.

In the hologram recording/reproducing apparatus, preferably, the hologram recording medium may be pre-recorded with identification information for identifying the hologram recording medium, the apparatus may further include a recording interval time information storage for pre-storing the identification information, and recording interval time information representing the recording interval time which differs depending on the number of times of recording the holograms in the certain recording area of the hologram recording medium in association with each other, and the recording interval time determining section may read out the identification information from the hologram recording medium, acquire the recording interval time information which is stored in association with the readout identification information from the recording interval time information storage, and determine the recording interval time based on the acquired recording interval time information.

In the above arrangement, the hologram recording medium is pre-recorded with the identification information for identifying the hologram recording medium. The recording interval time information storage pre-stores the identification information, and the recording interval time information representing the recording interval time which differs depending on the number of times of recording the holograms in the certain recording area of the hologram recording medium in association with each other. The identification information is read out from the hologram recording medium. The recording interval time information which is stored in association with the readout identification information is acquired from the recording interval time information storage. The recording interval time is determined based on the acquired recording interval time information.

The above arrangement enables to easily specify the recording interval time based on the identification information of the hologram recording medium by pre-storing the recording interval time information in the hologram recording/reproducing apparatus.

In the hologram recording/reproducing apparatus, preferably, the recording area of the hologram recording medium may be divided into a plurality of recording regions for recording the holograms, each of the recording regions may be divided into logical recording blocks depending on the number of times of multiplex recording the holograms, and the holograms may be recorded in each of the recording blocks by using the recording block having a shorter recording interval time and the recording block having a longer recording interval time in combination.

In the above arrangement, the recording area of the hologram recording medium is divided into the plurality of recording regions for recording the holograms. Each of the recording regions is divided into the logical recording blocks depending on the number of times of multiplex recording the holograms. The holograms are recorded in each of the recording blocks by using the recording block having the shorter recording interval time and the recording block having the longer recording interval time in combination.

For instance, in the case where holograms are multiplex-recorded in a certain recording area, a certain time interval is required from the point of time when a certain hologram is recorded in the recording area to the point of time when a succeeding hologram is recorded in the same recording area. In this condition, in use of a hologram recording medium having a property that the reaction rate is gradually lowered, as the multiplex recording proceeds from an initial stage toward a late image, the data transfer rate in the late stage of the multiplex recording is extremely lowered, and it takes a considerably long time until the hologram recording medium finally attains the recording capacity of the recording area. In view of the above, recording the holograms by using a recording block having a shorter recording time interval and a recording block having a longer recording time interval in combination, in place of sequentially recording holograms in a recording block having a short recording interval time or in a recording block having a long recording interval time, enables to maintain the average hologram recording speed at a substantially constant level, thereby enabling to maintain the data transfer rate at a substantially constant level.

In the hologram recording/reproducing apparatus, preferably, the holograms may be recorded in such an order that the holograms are recorded in a first recording block having a smallest number of times of multiplex recording within a first recording region of the recording regions, the holograms are recorded in a second recording block having a smallest number of times of multiplexing in a second recording region adjacent the first recording region, and the holograms are recorded in a third recording block in the first recording region having a second smallest number of times of multiplex recording within the first recording region.

In the above arrangement, the holograms are recorded in the first recording block having the smallest number of times of multiplex recording within the first recording region of the recording regions. Then, the holograms are recorded in the second recording block having the smallest number of times of multiplex recording in the second recording region adjacent the first recording region. Subsequently, the holograms are recorded in the third recording block in the first recording region having the second smallest number of times of multiplex recording within the first recording region.

The above arrangement enables to use the recording blocks having the different recording interval times in combination. This enables to maintain the average hologram recording speed at a substantially constant level, thereby enabling to maintain the data transfer rate at a substantially constant level.

In the hologram recording/reproducing apparatus, preferably, an array of holograms may be consecutively recorded within the recording block in a direction of recording the holograms, and the hologram array may be recorded multiple times one over the other within the recording block.

In the above arrangement, the array of holograms are consecutively recorded within the recording block in the direction of recording the holograms, and the hologram arrays are recorded multiple times one over the other within the recording block. This enables to prioritize recording of the holograms whose recording interval time is short and whose multiplicity number is small.

In the hologram recording/reproducing apparatus, preferably, the recording interval times for the holograms in the recording block may be identical to each other. In this arrangement, since the recording interval times for the holograms in the recording block are identical to each other, there is no need of changing the recording interval time each time the hologram is recorded in the recording block. This enables to eliminate or suppress a processing time for determining the recording interval time.

A hologram recording medium according to yet another aspect of the invention is a hologram recording medium provided with a recording layer and adapted for use in recording information by forming holograms by irradiation of a reference beam and a signal beam onto the recording layer, wherein the hologram recording medium is pre-recorded with reaction rate information relating to a reaction rate of a material composing the recording layer, at which the hologram having an intended diffraction efficiency is to be formed on the recording layer by light irradiation, or recording interval time information relating to a recording interval time from the point of time when light is irradiated to record a certain hologram of the holograms to be multiplex-recorded to the point of time when light is irradiated to record a succeeding hologram in such a manner that at least parts of the holograms are recorded one over the other in the certain recording area.

In the above arrangement, the hologram recording medium is pre-recorded with the reaction rate information relating to the reaction rate of the material composing the recording layer, at which the hologram having the intended diffraction efficiency is to be formed on the recording layer by light irradiation, or the recording interval time information relating to the recording interval time from the point of time when the light is irradiated to record the certain hologram of the holograms to be multiplex-recorded to the point of time when the light is irradiated to record the succeeding hologram in such a manner that at least parts of the holograms are recorded one over the other in the certain recording area.

In the above arrangement, since the reaction rate information or the recording interval time information is read out from the hologram recording medium, an optimal recording interval time depending on the reaction rate inherent to the material composing the hologram recording medium can be determined by using the reaction rate information. Thus, the recording interval time can be easily determined by using the recording interval time information.

In the hologram recording medium, preferably, the reaction rate information or the recording interval time information may be recorded inside or on a surface of the hologram recording medium. In this arrangement, the reaction rate information or the recording interval time information can be read out from the interior or the surface of the hologram recording medium.

Preferably, the hologram recording medium may further include a cartridge, and the reaction rate information or the recording interval time information may be recorded on a surface or inside the cartridge. In this arrangement, the reaction rate information or the recording interval time information can be read out from the interior or the surface of the cartridge.

Preferably, the hologram recording medium may further include a cartridge, and a memory which is provided on a surface or inside the cartridge, or which is provided on a surface or inside the hologram recording medium, and the reaction rate information or the recording interval time information may be recorded in the memory.

In this arrangement, the reaction rate information or the recording interval time information can be read out from the memory which is provided on the surface or the interior of the cartridge, or which is provided on the surface or the interior of the hologram recording medium.

The hologram recording/reproducing apparatus, the hologram multiplex recording method, and the hologram recording medium of the invention are useful as a hologram recording/reproducing apparatus, a hologram multiplexing recording method, and a hologram recording medium that enable to prevent lowering of a dynamic range of the hologram recording medium without lowering an average data transfer rate, to provide stabilized recording sensitivity, to multiplex record holograms to be formed by a signal beam carrying certain two-dimensional data, and a reference beam to be emitted from a light source for emitting the signal beam in a certain recording area of the hologram recording medium multiple times, and to reproduce the recorded holograms by irradiating the reference beam.

This application is based on Japanese Patent Application No. 2006-218042 filed on Aug. 10, 2006, the contents of which are hereby incorporated by reference.

Although the invention has been appropriately and fully described by way of examples with reference to the accompanying drawings, it is to be understood that various changes and/or modifications will be apparent to those skilled in the art. Therefore, unless otherwise such changes and/or modifications depart from the scope of the present invention hereinafter defined, they should be construed as being included therein.

What is claimed is:

1. A hologram recording and reproducing apparatus for recording holograms to be formed by a signal beam carrying certain two-dimensional data, and a reference beam to be emitted from a light source for emitting the signal beam in a certain recording area of a hologram recording medium multiple times, and for reproducing the recorded holograms by irradiating the reference beam, the apparatus comprising:

a reaction rate information acquiring section for acquiring reaction rate information representing a reaction rate at which the hologram having an intended diffraction efficiency is formed for recording in the hologram recording medium by the light irradiation;

a recording interval time determining section for determining a recording interval time from the point of time when light is irradiated to record a certain hologram of the holograms to be multiplex-recorded to the point of time when light is irradiated to record a succeeding hologram in such a manner that at least parts of the holograms are recorded one over the other in the certain recording area based on the reaction rate information acquired by the reaction rate information acquiring section; and a controlling section for controlling the light to be irradiated from the light source depending on the recording interval time determined by the recording interval time determining section.

2. The hologram recording and reproducing apparatus according to claim 1, wherein the recording interval time determining section determines a recording energy amount with respect to each of the holograms, and the controlling section controls the light to be irradiated from the light source depending on the recording energy amount determined by the recording interval time determining section.

3. The hologram recording and reproducing apparatus according to claim 1, wherein the reaction rate information acquiring section acquires the reaction rate information representing the reaction rate which is changed in time-series, as the multiplex recording with respect to the hologram recording medium proceeds from an initial stage toward a late stage.

4. The hologram recording and reproducing apparatus according to claim 1, further comprising:

a multiplicity information acquiring section for acquiring multiplicity information representing the number of times of recording the holograms in the certain recording area of the hologram recording medium, wherein the recording interval time determining section determines the recording interval time based on the multiplicity information acquired by the multiplicity information acquiring section.

5. The hologram recording and reproducing apparatus according to claim 1, wherein the recording interval time determining section determines a duration from the point of time when the light irradiation is started to record the certain hologram to the point of time when the light irradiation is started to record the succeeding hologram, as the recording interval time.

6. The hologram recording and reproducing apparatus according to claim 1, wherein
the recording interval time determining section determines a duration from the point of time when the light irradiation is terminated to record the certain hologram to the point of time when the light irradiation is started to record the succeeding hologram, as the recording interval time.

7. The hologram recording and reproducing apparatus according to claim 1, wherein
the recording interval time determining section determines the recording interval time in such a manner that the recording interval time satisfies a relation:

$$t_{(N)} \leqq t_{(N+1)}$$

where $t_{(N)}$ is a recording interval time from the point of time when the N-th hologram is recorded to the point of time when the (N+1)-th hologram is recorded, and $t_{(N+1)}$ is a recording interval time from the point of time when the (N+1)-th hologram is recorded to the point of time when the (N+2)-th hologram is recorded, with respect to the holograms to be multiplex-recorded.

8. The hologram recording and reproducing apparatus according to claim 1, wherein
the hologram recording medium is pre-recorded with identification information for identifying the hologram recording medium, wherein
the apparatus further includes a reaction rate information storage for pre-storing the identification information and the reaction rate information concerning the hologram recording medium in association with each other, and
the reaction rate information acquiring section reads out the identification information from the hologram recording medium, and acquires the reaction rate information which is stored in association with the readout identification information from the reaction rate information storage.

9. The hologram recording and reproducing apparatus according to claim 8, wherein
the identification information is recorded in the hologram recording medium.

10. The hologram recording and reproducing apparatus according to claim 8, wherein
the hologram recording medium includes a cartridge, and the identification information is recorded on the cartridge of the hologram recording medium.

11. The hologram recording and reproducing apparatus according to claim 8, wherein
the hologram recording medium includes cartridge and a memory on the cartridge, and the identification information is recorded in the memory on the cartridge of the hologram recording medium.

12. The hologram recording and reproducing apparatus according to claim 8, wherein
the hologram recording medium includes a memory, and the identification information is recorded in the memory provided on the hologram recording medium.

13. The hologram recording and reproducing apparatus according to claim 1, wherein
the hologram recording medium is pre-recorded with identification information for identifying the hologram recording medium,
the apparatus further includes a recording interval time information storage for pre-storing the identification information and recording interval time information representing the recording interval time which differs depending on the number of times of recording the holograms in the certain recording area of the hologram recording medium in association with each other, and
the recording interval time determining section reads out the identification information from the hologram recording medium, acquires the recording interval time information which is stored in association with the readout identification information from the recording interval time information storage, and determines the recording interval time based on the acquired recording interval time information.

14. The hologram recording and reproducing apparatus according to claim 1, wherein
the recording area of the hologram recording medium is divided into a plurality of recording regions for recording the holograms, each of the recording regions is divided into logical recording blocks depending on the number of times of multiplex recording the holograms, and the holograms are recorded in each of the recording blocks by using the recording block having a shorter recording interval time and the recording block having a longer recording interval time in combination.

15. The hologram recording and reproducing apparatus according to claim 14, wherein
the holograms are recorded in such an order that the holograms are recorded in a first recording block having a smallest number of times of multiplex recording within a first recording region of the recording regions, the holograms are recorded in a second recording block having a smallest number of times of multiplex recording in a second recording region adjacent the first recording region, and the holograms are recorded in a third recording block in the first recording region having a second smallest number of times of multiplex recording within the first recording region.

16. The hologram recording and reproducing apparatus according to claim 14, wherein
an array of holograms are consecutively recorded within the recording block in a direction of recording the holograms, and the hologram array is recorded multiple times one over the other within the recording block.

17. The hologram recording and reproducing apparatus according to claim 14, wherein
the recording interval times for the holograms in the recording block are identical to each other.

18. The hologram recording and reproducing apparatus according to claim 1, wherein
identification information for identifying the hologram recording medium is pre-recorded in the hologram recording medium,
the apparatus further includes a reaction rate information storage for pre-storing the identification information and the reaction rate information concerning the hologram recording medium in association with each other, and
the reaction rate information acquiring section reads out the identification information from the hologram recording medium, and acquires the reaction rate information which is stored in association with the readout identification information from the reaction rate information storage.

19. The hologram recording and reproducing apparatus according to claim 1, wherein
identification information for identifying the hologram recording medium is pre-recorded on a cartridge of the hologram recording medium, the apparatus further includes a reaction rate information storage for pre-storing the identification information and the reaction rate information concerning the hologram recording medium in association with each other, and the reaction rate information acquiring section reads out the identification information from the cartridge of the hologram recording medium, and acquires the reaction rate information which is stored in association with the readout identification information from the reaction rate information storage.

20. The hologram recording and reproducing apparatus according to claim 1, wherein identification information for identifying the hologram recording medium is pre-recorded in a memory on a cartridge of the hologram recording medium, the apparatus further includes a reaction rate information storage for pre-storing the identification information and the reaction rate information concerning the hologram recording medium in association with each other, and the reaction rate information acquiring section reads out the identification information from the memory on the cartridge of the hologram recording medium, and acquires the reaction rate information which is stored in association with the readout identification information from the reaction rate information storage.

21. The hologram recording and reproducing apparatus according to claim 1, wherein identification information for identifying the hologram recording medium is pre-recorded in a memory on the hologram recording medium, the apparatus further includes a reaction rate information storage for pre-storing the identification information and the reaction rate information concerning the hologram recording medium in association with each other, and the reaction rate information acquiring section reads out the identification information from the memory on the hologram recording medium, and acquires the reaction rate information which is stored in association with the readout identification information from the reaction rate information storage.

22. The hologram recording and reproducing apparatus according to claim 1, wherein the hologram recording medium is pre-recorded with identification information for identifying the hologram recording medium, the apparatus further includes a recording interval time information storage for pre-storing the identification information and recording interval time information representing the recording interval time which differs depending on the number of times of recording the holograms in the certain recording area of the hologram recording medium in association with each other, and the recording interval time determining section reads out the identification information from the hologram recording medium, acquires the recording interval time information which is stored in association with the readout identification information from the recording interval time information storage, and determines the recording interval time based on the acquired recording interval time information.

23. The hologram recording and reproducing apparatus according to claim 1, wherein identification information for identifying the hologram recording medium is pre-recorded on a cartridge of the hologram recording medium, the apparatus further includes a recording interval time information storage for pre-storing the identification information and recording interval time information representing the recording interval time which differs depending on the number of times of recording the holograms in the certain recording area of the hologram recording medium in association with each other, and the recording interval time determining section reads out the identification information from the cartridge of the hologram recording medium, acquires the recording interval time information which is stored in association with the readout identification information from the recording interval time information storage, and determines the recording interval time based on the acquired recording interval time information.

24. The hologram recording and reproducing apparatus according to claim 1, wherein identification information for identifying the hologram recording medium is pre-recorded in a memory on a cartridge of the hologram recording medium, the apparatus further includes a recording interval time information storage for pre-storing the identification information and recording interval time information representing the recording interval time which differs depending on the number of times of recording the holograms in the certain recording area of the hologram recording medium in association with each other, and the recording interval time determining section reads out the identification information from the memory of the cartridge of the hologram recording medium, acquires the recording interval time information which is stored in association with the readout identification information from the recording interval time information storage, and determines the recording interval time based on the acquired recording interval time information.

25. The hologram recording and reproducing apparatus according to claim 1, wherein identification information for identifying the hologram recording medium is pre-recorded in a memory on the hologram recording medium, the apparatus further includes a recording interval time information storage for pre-storing the identification information and recording interval time information representing the recording interval time which differs depending on the number of times of recording the holograms in the certain recording area of the hologram recording medium in association with each other, and the recording interval time determining section reads out the identification information from the memory on the hologram recording medium, acquires the recording interval time information which is stored in association with the readout identification information from the recording interval time information storage, and determines the recording interval time based on the acquired recording interval time information.

26. A hologram multiplex recording method for recording holograms to be formed by a signal beam carrying certain two-dimensional data, and a reference beam to be emitted from a light source for emitting the signal beam in a certain recording area of a hologram recording medium multiple times, the method comprising:

a reaction rate information acquiring step of acquiring reaction rate information representing a reaction rate at which the hologram having an intended diffraction efficiency is formed for recording in the hologram recording medium by the light irradiation;

a recording interval time determining step of determining a recording interval time from the point of time when light is irradiated to record a certain hologram of the holograms to be multiplex-recorded to the point of time when light is irradiated to record a succeeding hologram in such a manner that at least parts of the holograms are recorded one over the other in the certain recording area based on the reaction rate information acquired by in the reaction rate information acquiring step; and a controlling step of controlling the light to be irradiated from the light source depending on the recording interval time determined in the recording interval time determining step.

27. A hologram recording medium provided with a recording layer and adapted for use in recording information by forming holograms by irradiation of a reference beam and a signal beam onto the recording layer, wherein the hologram recording medium is pre-recorded with reaction rate information relating to a reaction rate of a material composing the recording layer, at which the hologram having an intended diffraction efficiency is to be formed on the recording layer by light irradiation, or recording interval time information relating to a recording interval time from the point of time when light is irradiated to record a certain hologram of the holograms to be multiplex-recorded to the point of time when light is irradiated to record a succeeding hologram in such a manner that at least parts of the holograms are recorded one over the other in the certain recording area.

* * * * *

UNITED STATES PATENT AND TRADEMARK OFFICE
CERTIFICATE OF CORRECTION

PATENT NO. : 7,903,310 B2
APPLICATION NO. : 11/889298
DATED : March 8, 2011
INVENTOR(S) : Tomoya Sugita et al.

Page 1 of 1

It is certified that error appears in the above-identified patent and that said Letters Patent is hereby corrected as shown below:

Title page, left column, between sections 65 and 51, insert:

--(30)     Foreign Application Priority Data

Aug. 10, 2006   (JP).....................................2006-218042--.

Signed and Sealed this
Sixteenth Day of August, 2011

David J. Kappos
*Director of the United States Patent and Trademark Office*